(12) United States Patent
    Guo

(10) Patent No.: US 10,127,233 B2
(45) Date of Patent: Nov. 13, 2018

(54) DATA PROCESSING METHOD AND DEVICE IN DISTRIBUTED FILE STORAGE SYSTEM

(71) Applicant: Huawei Technologies Co., Ltd., Shenzhen (CN)

(72) Inventor: Hongxing Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 497 days.

(21) Appl. No.: 14/806,064

(22) Filed: Jul. 22, 2015

(65) Prior Publication Data

US 2015/0324371 A1    Nov. 12, 2015

Related U.S. Application Data

(63) Continuation of application No. PCT/CN2013/091143, filed on Dec. 31, 2013.

(51) Int. Cl.
    *G06F 17/30*    (2006.01)
    *G06F 3/06*     (2006.01)
    *G06F 11/10*    (2006.01)

(52) U.S. Cl.
    CPC .......... *G06F 17/30076* (2013.01); *G06F 3/06* (2013.01); *G06F 11/1076* (2013.01);
    (Continued)

(58) Field of Classification Search
    CPC .................. G06F 3/067; G06F 11/1076; G06F 17/30194; G06F 17/30584
    See application file for complete search history.

(56) References Cited

U.S. PATENT DOCUMENTS

| 4,451,916 A | * | 5/1984 | Casper ............... H04B 10/2504 370/226 |
| 7,685,126 B2 | | 3/2010 | Patel et al. |

(Continued)

FOREIGN PATENT DOCUMENTS

| CN | 101834898 A | 9/2010 |
| CN | 102364472 A | 2/2012 |

(Continued)

OTHER PUBLICATIONS

Downey, J., "Eventual Consistency: How Eventual? How Consistent?," XP55090383, Retrieved from the Internet: URL: https://jimdowney.net/2012/03/01/eventual-consistency-how-eventual-how-consistent/#comments [retrieved on Jul. 12, 2017], Mar. 1, 2012, 4 pages.

(Continued)

*Primary Examiner* — Amanda L Willis
*Assistant Examiner* — Vaishali Shah
(74) *Attorney, Agent, or Firm* — Conley Rose, P.C.

(57) ABSTRACT

A data processing method and a device in a distributed file storage system, where the method includes receiving, by a client agent, a data processing request which carries a file identifier, an offset address, a file length, and other information of a target file; obtaining, by the client agent, redundancy information according to the file identifier carried in the data processing request, where the redundancy information includes a quantity of data strips, N, of the distributed file storage system and a quantity of parity strips, M, of the distributed file storage system; determining a quantity of valid strips, DSC, of the target file according to the offset address and the length information; determining a quantity of actual strips, N', of the target file according to the DSC and the M; and determining corresponding strips according to the N' and processing the corresponding strips.

13 Claims, 8 Drawing Sheets

(52) U.S. Cl.
CPC ...... *G06F 17/302* (2013.01); *G06F 17/30091* (2013.01); *G06F 17/30138* (2013.01); *G06F 17/30194* (2013.01); *G06F 17/30876* (2013.01); *G06F 2211/1028* (2013.01)

(56) References Cited

U.S. PATENT DOCUMENTS

| | | | |
|---|---|---|---|
| 8,209,587 B1 | 6/2012 | Taylor et al. | |
| 2003/0105922 A1* | 6/2003 | Tomita | G06F 11/1076 711/114 |
| 2003/0188097 A1 | 10/2003 | Holland et al. | |
| 2006/0075381 A1* | 4/2006 | Laborczfalvi | G06F 9/468 717/100 |
| 2007/0094269 A1* | 4/2007 | Mikesell | G06F 11/1435 |
| 2009/0138871 A1* | 5/2009 | Kimberly | G06F 8/61 717/173 |
| 2011/0113207 A1 | 5/2011 | Fiske | |
| 2012/0174109 A1* | 7/2012 | Dolby | G06F 11/1474 718/101 |
| 2012/0246388 A1 | 9/2012 | Hashimoto | |
| 2013/0301880 A1* | 11/2013 | Chen | G06T 7/0044 382/103 |
| 2014/0059301 A1* | 2/2014 | Rao | G06F 11/1012 711/150 |
| 2014/0317222 A1 | 10/2014 | Li et al. | |
| 2015/0127919 A1* | 5/2015 | Baldwin | G06F 11/1076 711/166 |

FOREIGN PATENT DOCUMENTS

| | | |
|---|---|---|
| CN | 102624866 A | 8/2012 |
| CN | 102801784 A | 11/2012 |
| CN | 102855194 A | 1/2013 |
| EP | 0594464 A2 | 10/1993 |
| JP | H0772985 A | 3/1995 |
| JP | 2012517628 A | 8/2012 |
| WO | 2005043378 A2 | 5/2005 |
| WO | 2006062269 A1 | 6/2006 |
| WO | 2010089196 A1 | 8/2010 |

OTHER PUBLICATIONS

"RAID," XP55390905, Wikipedia, Retrieved from the Internet: URL: https://en.wikipedia.org/w/index.php?title=RAID&oldid=588434337#software-based_RAID [retrieved on Jul. 14, 2017], Dec. 30, 2013, 7 pages.

Foreign Communication From A Counterpart Application, PCT Application No. PCT/CN2013/091143, English Translation of International Search Report dated Sep. 30, 2014, 2 pages.

Foreign Communication From A Counterpart Application, PCT Application No. PCT/CN2013/091143, Written Opinion dated Sep. 30, 2014, 3 pages.

Partial English Translation and Abstract of Japanese Patent Application No. JPA2012517628, Dec. 14, 2016, 26 pages.

Partial English Translation and Abstract of Japanese Patent Application No. JPH07-72985, Dec. 14, 2016, 21 pages.

Inoguchi, Y., et al., "Autonomous Distributed Storage System for Grid that Considers Reliability," Information Processing Society Journal, Japan, vol. 47, No. SIG 7, May 15, 2006, pp. 219-230.

English Translation of Inoguchi, Y., et al., "Autonomous Distributed Storage System for Grid that Considers Reliability," Information Processing Society Journal, Japan, vol. 47, No. SIG 7, May 15, 2006, 34 pages.

Foreign Communication From A Counterpart Application, Chinese Application No. 2015-559412, Chinese Office Action dated Oct. 4, 2016, 4 pages.

Foreign Communication From A Counterpart Application, Chinese Application No. 2015-559412, English Translation of Chinese Office Action dated Oct. 4, 2016, 4 pages.

Foreign Communication From A Counterpart Application, Chinese Application No. 201380002274.8, Chinese Office Action dated Jun. 20, 2016, 3 pages.

Foreign Communication From A Counterpart Application, Chinese Application No. 201380002274.8, Chinese Search Report dated Jun. 12, 2016, 2 pages.

Foreign Communication From A Counterpart Application, European Application No. 13900799.1, Extended European Search Report dated Apr. 16, 2011, 7 pages.

Foreign Communication From A Counterpart Application, Australian Application No. 2013409624, Australian Notice of Acceptance dated Nov. 7, 2016, 2 pages.

Foreign Communication From a Counterpart Application, European Application No. 13900799.1, Extended European Search Report dated Apr. 11, 2011, 7 pages.

Downey, J., "Eventual Consistency: How Eventual? How Consistent?," XP55390383, Retrieved from the Internet: URL: https://jimdowney.net/2012/03/01/eventual-consistency-how-eventual-how-consistent/#comments [retrieved on Jul. 12, 2017], Mar. 1, 2012, 4 pages.

"Raid"XP55390905, Wikipedia, Retrieved from the Internet: URL: https://en.wikipedia.org/w/index.php?title=RAID&oldid=588434337#software-based_RAID [retrieved on Jul. 14, 2017], Dec. 30, 2013, 7 pages.

Foreign Communication From a Counterpart Application, European Application No. 13900799.1, European Oral Proceedings dated Jul. 24, 2017, 8 pages.

* cited by examiner

DATA PROCESSING METHOD AND DEVICE IN DISTRIBUTED FILE STORAGE SYSTEM

CROSS-REFERENCE TO RELATED APPLICATIONS

This application is a continuation of International Application No. PCT/CN2013/091143, filed on Dec. 31, 2013, which is hereby incorporated by reference in its entireties.

TECHNICAL FIELD

The present disclosure relates to the field of storage technologies, and in particular, to a data processing method and device in a distributed file storage system.

BACKGROUND

The development of computer technologies and network technologies and the informatization of human life have resulted in requirements from users for increasingly large storage capacities of storage systems and increasingly high performance of the storage systems. A storage system also develops from a memory built in a computer to an independent storage system, such as a storage array, or a network attached storage (NAS), and then to a large-scale distributed file storage system. As the degree of digitization increases, a storage object also changes from an object that is mainly structured data to an object that is mainly unstructured file data such as pictures or micro videos. This raises higher requirements on the file data access performance of the storage system, and therefore it becomes the top priority in the current storage field to improve the access performance of a large-scale distributed file storage system.

A distributed file storage system includes multiple storage server nodes, where the multiple storage servers are interconnected by using a network (for example, an InfiniBand (IB) network, or a 10 Gigabit (G) Ethernet) with low latency and high throughput to form a cluster, and constitute a large-scale network redundant array of inexpensive disks (RAID); in addition, all the storage servers externally provide a data read-write service simultaneously. When file data is stored in the distributed file storage system, striping is performed on the file data by using an algorithm, such as a cross-node RAID algorithm (for example, RAID5, RAID6, or RAIDZ), or an erasure code algorithm, that is, the file data is divided into multiple data strips, corresponding parity strips are generated, and then the data strips and the parity strips are stored to a storage server of a corresponding node. When the stored file data is read, a certain quantity of data strips and parity strips are read from the storage server node to subsequently construct original file data that needs to be read by a user.

As the size of the cluster in the distributed file storage system increases, in order to improve space utilization of the entire distributed file storage system, an increasingly large quantity of data strips are obtained by division when striping is performed on the file data, and quantities of disk input output (IO) operations and network IO operations increase accordingly when read-write operations are performed. In this way, the quantity of data strips obtained by division when striping is performed on the file data increases accordingly, thereby imposing a heavy burden on the access performance of a distributed file storage system in a scenario of a small file.

SUMMARY

In view of this, a technical problem to be solved by the present disclosure is how to improve the access performance of a distributed file storage system in a scenario of a small file.

To achieve the foregoing objective, embodiments of the present disclosure use the following technical solutions:

A first aspect of the present disclosure provides a data processing method applied to a distributed file storage system, where the method includes: receiving, by a client agent, a data processing request of a user, where the data processing request carries a file identifier, an offset address, a file length, and other information of a target file; and the target file is a file that needs to be processed in the data processing request; obtaining, by the client agent, redundancy information according to the file identifier, of the target file, carried in the data processing request, where the redundancy information includes a quantity of data strips, N, of the distributed file storage system and a quantity of parity strips, M, of the distributed file storage system; determining a quantity of valid strips, Data Strip Count (DSC), of the target file according to the offset address and the file length of the target file that are carried in the data processing request, where the valid strips are strips that include data of the target file; determining a quantity of actual strips, N', of the target file according to the quantity of the valid strips, DSC, and the quantity of the parity strips, M; and determining corresponding strips according to the quantity of the actual strips, N', and processing the corresponding strips.

With reference to the first aspect, in a possible implementation manner, the determining a quantity of actual strips, N', of the target file according to the quantity of the valid strips, DSC, and the quantity of the parity strips, M, is specifically that: if the quantity of the valid strips, DSC, is less than or equal to the quantity of the parity strips, M, the quantity of the actual strips, N', of the target file is the quantity of the parity strips, M, plus 1, that is, N'=M+1; or if the quantity of the valid strips, DSC, is greater than the quantity of the parity strips, M, the quantity of the actual strips, N', of the target file is equal to the quantity of the valid strips, DSC, that is, N'=DSC.

With reference to the first aspect and the foregoing possible implementation manner, in another possible implementation manner, there are a plurality of the quantity of the parity strips, M, and a plurality of the quantity of the data strips, N, where M and N correspond to each other and are separately stored in a corresponding directory information table.

With reference to the first aspect and the foregoing possible implementation manners, in another possible implementation manner, when the data processing request is a data write request, the determining corresponding strips according to the quantity of the actual strips, N', and processing the corresponding strips further includes performing striping processing on the target file to obtain N' actual strips, and generating M parity strips by using a redundancy algorithm, adding consistency label information and information about the quantity of the valid strips, DSC, to the N' actual strips and the M parity strips, where the consistency label information may be a timestamp or a version number, and writing the N' actual strips and the M parity strips to a corresponding storage server node separately.

With reference to the first aspect and the foregoing possible implementation manners, in another possible implementation manner, when the data processing request is a data read request, the method further includes: acquiring distribution information of the strips of the target file according to the file identifier; and the determining corresponding strips according to the quantity N' of the actual strips and processing the corresponding strips is specifically generating a new data block read request, where the data block read request is used to read a strip of the target file from a storage server node; and sending, according to the acquired distribution information of the strips of the target file, the data block read request to a storage server node that stores an actual strip, receiving a response message of the storage server node that stores the actual strip, where the response message is a successful-response message indicating that the actual strip can be read or an unsuccessful-response message indicating that the actual strip cannot be read, and the successful-response message carries consistency label information and information about the quantity of the valid strips, DSC, of the actual strip, and determining, according to the received response message, whether the target file can be read.

With reference to the first aspect and the foregoing possible implementation manners, in another possible implementation manner, the determining, according to the received response message, whether the target file can be read is specifically that if a quantity of received successful-response messages is equal to the quantity of the actual strips, N', and consistency label information and information about the quantity of the valid strips, DSC, that are carried in all the successful-response messages are separately the same, the target file can be read, or if a quantity of received successful-response messages is less than the quantity of the actual strips, N', it is determined whether the quantity of the received successful-response messages is greater than the quantity of the parity strips, M, and if the quantity of the received successful-response messages is greater than the quantity of the parity strips, M, it is determined whether the quantity of the successful-response messages is greater than or equal to the quantity of the valid strips, DSC, of the target file, and whether consistency label information and information about the quantity of the valid strips, DSC, that are carried in the successful-response messages are separately the same; if the quantity of the successful-response messages is greater than or is equal to the quantity of the valid strips, DSC, of the target file, and the consistency label information and the information about the quantity of the valid strips, DSC, that are carried in all the successful-response messages are separately the same, the target file can be read; if the quantity of the successful-response messages is not greater than or equal to the quantity of the valid strips, DSC, of the target file, and the consistency label information and the information about the quantity of the valid strips, DSC, that are carried in all the successful-response messages are not separately the same, the data block read request is sent, according to the acquired distribution information, to a storage server node that stores a parity strip; if a quantity of successful-response messages returned by the storage server node that stores the parity strip is greater than or equal to the quantity of the valid strips, DSC, of the target file, and consistency label information and information about the quantity of the valid strips, DSC, that are carried in the successful-response messages are separately the same, the target file can be read; or if a quantity of successful-response messages returned by the storage server node that stores the parity strip is less than the quantity of the valid strips, DSC, of the target file, or consistency label information and information about the quantity of the valid strips, DSC, that are carried in the successful-response messages are not separately the same, the target file cannot be read.

With reference to the first aspect and the foregoing possible implementation manners, in another possible implementation manner, the method further includes if the quantity of the received successful-response messages is less than or equal to the quantity of the parity strips, M, the data block read request is sent, according to the acquired distribution information, to the storage server node that stores the parity strip, receiving a response message returned by the storage server node that stores the parity strip, and determining, according to the response message returned by the storage server node that stores the parity strip, whether the target file can be read.

A second aspect of the present disclosure provides a device 30 for implementing a data processing method in a distributed file storage system, where: the device 30 communicates with a storage server node 101 in the distributed file storage system 10, and the device includes a receiving module 301, a processing module 303, and a sending module 305, where the receiving module 301 is configured to receive a data processing request of a user, where the data processing request carries a file identifier, an offset address, a file length, and other information of a target file; and the target file is a file that needs to be processed in the data processing request, the processing module 303 is configured to obtain redundancy information from the storage server node according to the file identifier, of the target file, carried in the data processing request, where the redundancy information includes a quantity of data strips, N, of the distributed file storage system and a quantity M of parity strips of the distributed file storage system, determine a quantity of valid strips, DSC, of the target file according to the offset address and the file length of the target file that are carried in the data processing request, where the valid strips are strips that include data of the target file, determine a quantity of actual strips, N', of the target file according to the quantity of the valid strips, DSC, and the quantity of the parity strips, M, and determine corresponding strips according to the quantity of the actual strips, N' and process the corresponding strips, and the sending module 305 is configured to feed back a result of the processing to the user.

With reference to the second aspect, in a possible implementation manner, the device 30 is located on an application server 20 that is connected to the distributed file storage system 10 or on the storage server node 101 in the distributed file storage system 10.

With reference to the second aspect and the foregoing possible implementation manner, in another possible implementation manner, the determining a quantity of actual strips, N', of the target file according to the quantity of the valid strips, DSC, and the quantity of the parity strips, M, is specifically that if the quantity of the valid strips, DSC, is less than or equal to the quantity of the parity strips, M, the quantity of the actual strips, N', of the target file is the quantity of the parity strips, M, plus 1, that is, N'=M+1, or if the quantity of the valid strips, DSC, is greater than the quantity of the parity strips, M, the quantity of the actual strips, N', of the target file is equal to the quantity of the valid strips, DSC, that is, N'=DSC.

With reference to the second aspect and the foregoing possible implementation manners, in another possible implementation manner, when the data processing request is a data write request, the determining corresponding strips according to the quantity of the actual strips, N', and processing the corresponding strips further includes performing striping processing on the target file to obtain N' actual strips, and generating M parity strips by using a redundancy algorithm, adding consistency label information and information about the quantity of the valid strips, DSC, to the N' actual strips and the M parity strips, where the consistency label information may be a timestamp or a version number, and writing the N' actual strips and the M parity strips to a corresponding storage server node separately.

With reference to the second aspect and the foregoing possible implementation manners, in another possible implementation manner, when the data processing request is a data read request, the determining corresponding strips according to the quantity of the actual strips, N', and processing the corresponding strips further includes generating a new data block read request, where the data block read request is used to read a strip of the target file from a storage server node; and sending, according to acquired distribution information of the strips of the target file, the data block read request to a storage server node that stores an actual strip, receiving a response message of the storage server node that stores the actual strip, where the response message is a successful-response message indicating that the actual strip can be read or an unsuccessful-response message indicating that the actual strip cannot be read, and the successful-response message carries consistency label information of the actual strip and information about the quantity of the valid strips, DSC, and determining, according to the received response message, whether the target file can be read.

With reference to the second aspect and the foregoing possible implementation manners, in another possible implementation manner, the receiving module is further configured to receive a data deletion request of the user, where the data deletion request carries a file identifier of a target file; and the target file is a file that needs to be deleted, the processing module obtains the redundancy information from the storage server node according to the file identifier, where the redundancy information includes the quantity of the data strips, N, of the distributed file storage system and the quantity of the parity strips, M, of the distributed file storage system, determines, according to the quantity of the data strips, N, of the distributed file storage system, a storage server node that stores a strip of the target file, sends the data deletion request to the storage server node that stores the strip of the target file, and receives a response message of the storage server node that stores the strip of the target file, where the response message is one of a response message indicating successful deletion, a response message indicating that the object to be deleted does not exist, and a response message indicating unsuccessful deletion, and when a quantity of received response messages indicating successful deletion and response messages indicating that the object to be deleted does not exist exceeds the quantity of, N, the data strips, the deletion is successful; otherwise, the deletion is unsuccessful; and the sending module is configured to feed back a result of the successful deletion or the unsuccessful deletion to the user.

In the embodiments of the present disclosure, a quantity of valid strips is determined according to a size of a target file, and a quantity of actual strips of the target file is further determined; therefore, in a case in which it can be ensured that an expected target file can be acquired in any case, a quantity of empty strips in a distributed file storage system 10 can further be reduced, which can reduce a large quantity of network read-write input/output (I/O) operations and disk read-write I/O operations in a scenario of a small file, thereby improving the performance of the distributed file storage system 10.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings.

DESCRIPTION OF EMBODIMENTS

Various exemplary embodiments, features, and aspects of the present disclosure are described in detail below with reference to the accompanying drawings. Same reference signs in the accompanying drawings indicate components with a same or similar function. Although various aspects of the embodiments are shown in the accompanying drawings, unless otherwise noted specifically, there is no need to draw the accompanying drawings to scale.

In addition, to better describe the present disclosure, numerous concrete details are provided in the following implementation manners. In some embodiments, to highlight the main idea of the present disclosure, methods, means, components, and circuits that are known by a person skilled in the art are not described in detail.

Figure 1:
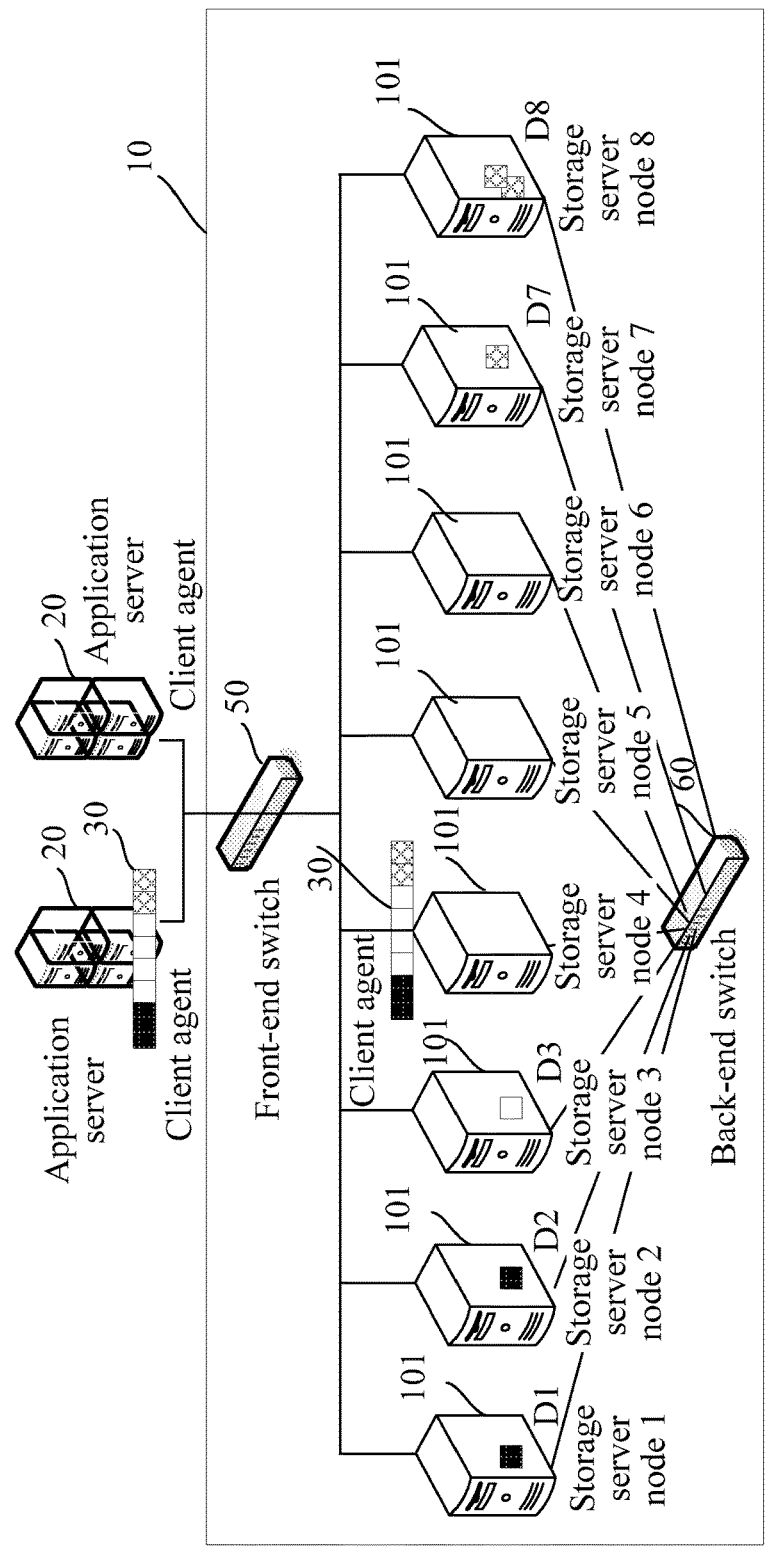
FIG. 1 is a schematic structural diagram of a distributed file storage system.

Main composition parts of a distributed file storage system 10 are shown in FIG. 1, including multiple storage server nodes 101, where the multiple storage server nodes 101 are interconnected by using a network (for example, an IB network, or a 10G Ethernet) with low latency and high throughput to form a cluster. The distributed file storage system 10 further includes a front-end switch 50 and a back-end switch 60. The front-end switch 50 is configured to implement external service requesting and data exchange between user data and the cluster. The back-end switch 60 is configured to implement internal requesting and data exchange between the storage server nodes in the cluster. An application server 20 communicates with the distributed file storage system 10 by using the front-end switch 50.

In the distributed file storage system 10, generally, each application interacts with a storage server node 101 in two manners. The first manner is that each application directly accesses, by using a standard portable operating system interface (POSIX), a file system client agent (CA) 30 that is deployed on the application server 20. As a portal, which externally provides a service, of the distributed file storage system 10, the client agent 30 interacts with the storage server node 101 in the cluster after receiving a request of the application. The second access manner is that each application accesses a corresponding network attached storage server (NAS Server) by using a commonly used NAS protocol (such as network file system (NFS)/common internet file system (CIFS)) client, where the NAS server and the storage server node 101 are deployed together, and then the NAS server accesses a file system client agent 30 that is deployed on the server node, to implement a storage service. In order to clearly describe an implementation principle of the present disclosure, the first access manner is used for specific description, and the second access manner uses a similar implementation principle.

A service system shown in FIG. 1 is used as an example. The service system includes two application servers 20, and the application servers 20 communicate with the distributed file storage system 10 by using the front-end switch 50. The client agent 30 is deployed on the application server 20, and a data processing request of a user is first sent to the client agent 30 on the application server 20, so that the client agent 30 performs corresponding processing on the data processing request. In a case in which the client agent 30 is deployed on a storage server node 101, after receiving the data processing request of the user, the application server 20 sends, by using the front-end switch 50, the data processing request to the client agent 30 on the corresponding storage server node 101, and the client agent 30 on the storage server node 101 processes the data processing request.

The storage server nodes 101 in the distributed file storage system 10 are interconnected to form a cluster, and constitute a large-scale network RAID, and an N+M redundancy protection mechanism is used for stored data. M is a quantity of parity strips used by the distributed file storage system 10 to perform redundancy protection on stored file data, and a specific value of M may be set to a fixed value according to a service requirement. N is a quantity of data strips that are generated when striping is performed on the file data, and N is calculated according to a quantity of storage server nodes in the distributed file storage system 10 and the value of M, or may be set to a fixed value according to a service requirement. A same value of N and a same value of M may be set in the distributed file storage system 10 for all directories, or a different value of N and a different value of M may be set for a certain directory, which is determined according to a service requirement. N and M of the distributed file storage system 10 are stored in a file data metadata information table of the distributed file storage system 10. The metadata information table is the same as that in an existing implementation manner and therefore is not additionally described herein. To make description clearer, one piece of file data to be processed is referred to as one data stripe, and when striping processing is performed on one data stripe, the data stripe is divided into N data strips and M parity strips are generated according to a redundancy algorithm.

The client agent 30 performs striping processing on received file data, divides the file data into N data strips, then generates M parity strips according to the redundancy algorithm, stores the generated data strips and parity strips to corresponding storage server nodes 101, and records a same timestamp or version number, or other consistency label information in the data strips and the parity strips. The N data strips and the M parity strips are written to the corresponding storage server nodes 101. The strips may be written to the storage server nodes 101 in a numbering order of the storage server nodes 101, or may be written to the corresponding server nodes 101 according to other rules. The write rules are the same as the existing write rules and are not additionally described herein. When a user needs to read the file data, the client agent 30 reads, by using identification information of the file data that needs to be read, a specific quantity of data strips or parity strips whose consistency label information is the same, to acquire the file data that needs to be read by the user. According to a consistency principle of the redundancy algorithm, when a data stripe for which N+M redundancy protection is used is read, at least N strips whose consistency label information is the same in N+M strips need to be acquired, so as to ensure that the read data stripe is expected data.

The distributed file storage system 10 shown in FIG. 1 includes 8 storage server nodes 101. It is assumed that M of the distributed file storage system 10 is set to 2, and N is set to 6. Certainly, M may be set to 2, and N may be set to 5. In this embodiment, that N is 6 and M is 2 is used as an example for description. When file data needs to be stored to the distributed file storage system 10, the client agent 30 on the application server 20 receives the file data that needs to be stored, performs striping processing on the file data to divide the file data into 6 data strips, then generates 2 parity strips by using the redundancy algorithm, and records a same timestamp or a version number, or other consistency label information in the data strips and the parity strips. The client agent 30 separately stores the 6 data strips on a storage server node 1 to a storage server node 6 in an order of the storage server nodes 101, and stores the 2 parity strips on a storage server node 7 and a storage server node 8 in order, which is, for example, shown in FIG. 2. When the file data needs to be read, the client agent 30 reads, according to identification information of the file data, at least 6 strips whose consistency label information is the same from the storage server nodes 101, where the 6 strips are any 6 strips in the data strips and the parity strips.

Figure 2:
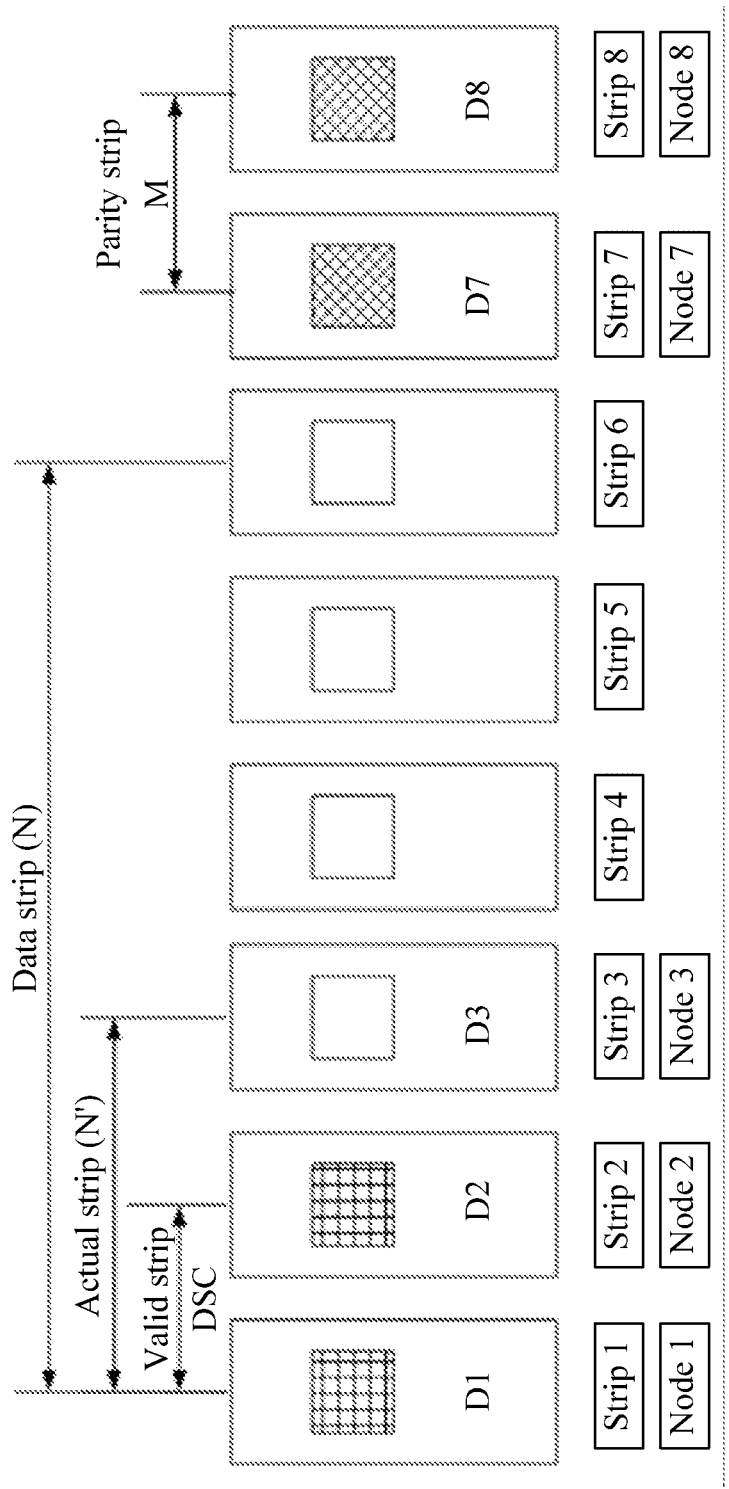
FIG. 2 is a schematic diagram of distribution of strips.

In a scenario of small file data, valid file data may occupy only some data strips; in an existing implementation solution, the remaining data strips are empty strips that do not include valid file data. As shown in FIG. 1 and FIG. 2, in the distributed file storage system 10 in which N is 6 and M is 2, there are 8 storage server nodes 101, the data strips are stored on the storage server node 1 to the storage server node 6, and the parity strips are stored on the storage server node 7 and the storage server node 8. When striping is performed on the small file data, only 2 data strips are occupied, for example, D1 and D2, which are stored on the storage server node 1 and the storage server node 2, and a timestamp T1 is recorded. The remaining 4 data strips D3 to D6 do not include file data, but the same timestamp T1 still needs to be recorded on the storage server nodes 3 to 6 in an existing implementation method. Parity strips D7 and D8 are stored on the storage server node 7 and the storage server node 8 respectively, and the same timestamp T1 is recorded. When the small file data is read, at least 6 strips in which the timestamp T1 is recorded need to be read, so as to acquire expected small file data. As a result, when the small file data is written or read, an IO operation on an empty strip is caused, and disk IO and network IO resources of the distributed file storage system are occupied. Because a large-scale distributed file storage system has a larger quantity of data strips, a quantity of empty strips generated for the small file data increases correspondingly. In this case, a large quantity of disk IO and network IO resources of the distributed file storage system are wasted, thereby affecting the IO performance of the distributed file storage system.

The present disclosure provides a new method for processing small file data in the distributed file storage system 10, which can reduce operations on empty strips, reduce disk IO and network IO overheads of the distributed file storage system, and improve the IO performance of the distributed file storage system. The present disclosure mainly uses an N'+M redundancy protection mechanism according to different sizes of files to be processed. M is a quantity of parity strips of the distributed file storage system, and N' is a quantity of actual strips that is determined according to a size of file data when striping is performed on the file data. A quantity N' of actual strips that are obtained by means of division may vary with a size of file data, thereby implementing dynamic adjustment of a quantity of actual strips of file data. This can reduce a quantity of empty strips in a scenario of a small file, so that the quantity of disk IO operations and network IO operations in the distributed file storage system is reduced, and the performance of the distributed file storage system is improved. In order to ensure that a solution provided by the present disclosure can still obtain expected file data in various abnormal cases, N' needs to be greater than M; in other words, the quantity of the actual data strips and the quantity of the parity strips need to satisfy a majority rule, and data can be restored in any abnormal case.

As shown in FIG. 1, the structure of the distributed file storage system 10 to which an embodiment of the present disclosure is applicable includes 8 storage server nodes 101, where the multiple storage server nodes 101 are interconnected by using a network (for example, an IB network, or a 10G Ethernet) with low latency and high throughput to form a cluster. The client agent 30 is deployed on the application server 20 and implements communication between user data and the cluster by using the front-end switch 50. The storage server nodes 101 in the cluster implement internal communication by using the back-end switch 60. The client agent 30 may also be deployed on each storage server node 101 in the distributed file storage system 10, and a function of the client agent 30 deployed on each storage server node 101 is similar to a function of the client agent 30 deployed on the application server 20 and is not additionally described.

In redundancy of the distributed file storage system, M is 2 and N is 6. M is a quantity of parity strips used by the distributed file storage system 10 to perform redundancy protection on stored file data, and a specific value of M may be set according to a service requirement. N is a quantity of data strips that are obtained by means of division when striping processing is performed on the file data, and N is calculated according to a quantity of storage server nodes in the distributed file storage system and the value of M, or may be set to a fixed value according to a service requirement. A same value of N and a same value of M may be set in the distributed file storage system for all directories, or a different value of N and a different value of M may be set for a certain directory, which is determined according to a service requirement. In this embodiment, a same N and a same M are used as an example for description. N and M of the distributed file storage system are stored in a file data metadata information table of the distributed file storage system 10.

Figure 3:
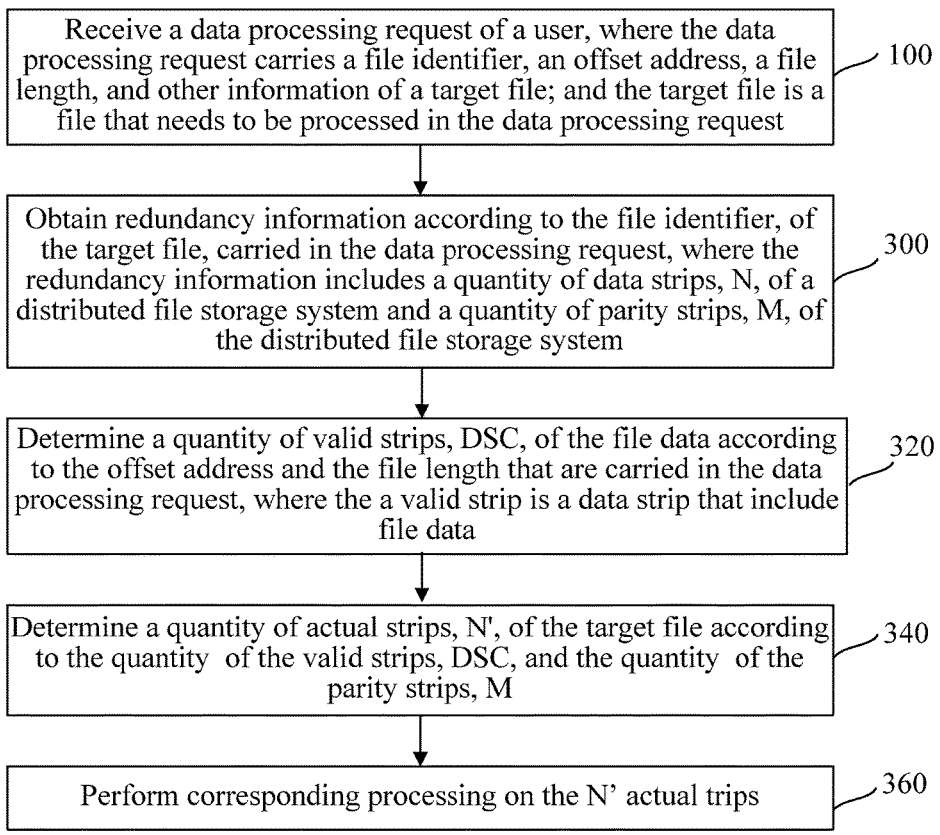
FIG. 3 is a schematic flowchart of a method for implementing a data processing request according to an embodiment of the present disclosure.

The client agent 30 on the application server 20 receives a data processing request of a user sent by an application, where the data processing request carries a file identifier (FID), an offset address, a file length, and other information of a target file, and the target file is a file to be processed, as shown in block 100 in FIG. 3. Then the client agent 30 obtains redundancy information according to the file identifier of the target file, carried in the data processing request; the redundancy information includes a quantity of data strips, N, of a distributed file storage system and a quantity of parity strips, M, of the distributed file storage system, as shown in block 300 in FIG. 3. A quantity of valid strips of file data, DSC, is calculated according to the offset address and the file length information that are carried in the data processing request, and a valid strip is a data strip that includes file data, as shown in block 320 in FIG. 3. In a scenario of small file data, a quantity of valid strips, DSC, that are obtained by means of division when striping is performed on the file data is less than a quantity of data strips, N, of the distributed file storage system. In the scenario of small file data, a larger-scale distributed file storage system indicates a greater difference between the quantity of the valid strips, DSC, and the quantity of the data strips, N, of the distributed file storage system.

When the client agent 30 is deployed on a storage server node 101 in the distributed file storage system 10, after receiving a data processing request, the application server 20 sends the data processing request to the client agent 30 on a storage server node by using the front-end switch 50. A method for sending the data processing request to the client agent on the storage server node 101 by the application server 20 is similar to an existing method and is not described in detail again. A method for processing the data processing request by the client agent 30 on the storage server node 101 is similar to a processing manner of the client agent 30 on the application server 20 and is not additionally described.

The client agent 30 on the application server 20 compares the calculated quantity of the valid strips, DSC, with the quantity of the parity strips, M, and determine the quantity of the actual strips, N', of the target file according to the quantity of the valid strips, DSC, of the valid strips and the quantity of the parity strips, M, as shown in Block 340 in FIG. 3. According to the majority rule of the redundancy algorithm, in order to ensure that expected file data can be acquired during processing no matter what fault occurs, a quantity of strips that exceeds the quantity of the parity strips, M, needs to be read. When the quantity of the valid strips, DSC, is less than or equal to the quantity of the parity strips, M, that is, DSC≤M, the quantity of the actual strips, N', is equal to the quantity of the parity strips, M, plus 1, that is, N'=M+1. A quantity difference between the quantity of the actual strips, N', and the quantity of the valid strips, DSC, needs to be complemented by adding an empty strip, that is, a quantity of empty strips that need to be added, empty strip count (ESC), in this case is ESC=N'−DSC=(M+1)−DSC. This can reduce the quantity of the empty strips in the distributed file storage system, and correspondingly reduce read-write IO operations on the empty strips, thereby improving the IO performance of the distributed file storage system.

When the quantity of the valid strips, DSC, is greater than the quantity of the parity strips, M, that is, DSC>M, the quantity of the actual strips, N', is equal to the quantity of the valid strips, DSC, that is, N'=DSC. In this case, the quantity of the empty strips is 0; in other words, no empty strip needs to be added, thereby reducing the quantity of the empty strips in the distributed file storage system.

When the file data is large, the quantity of the valid strips, DSC, may be the same as the quantity of the data strips N of the distributed file storage system, and in this case, the quantity of the empty strips is 0, that is, no empty strip needs to be added.

The quantity of the actual strips N' is dynamically adjusted according to a size of file data, and especially in a scenario of small file data, the quantity of the actual strips N', instead of the quantity of the data strips N of the distributed file storage system, is used, so that the quantity of the empty strips in the distributed file storage system is effectively reduced. Correspondingly, read-write IO operations on the empty strips are reduced, and the IO performance of the distributed file storage system is improved.

The client agent 30 performs corresponding processing on the N' actual strips, as shown in Block 360 in FIG. 3. A specific processing manner varies according to different types of data processing requests.

Figure 4:
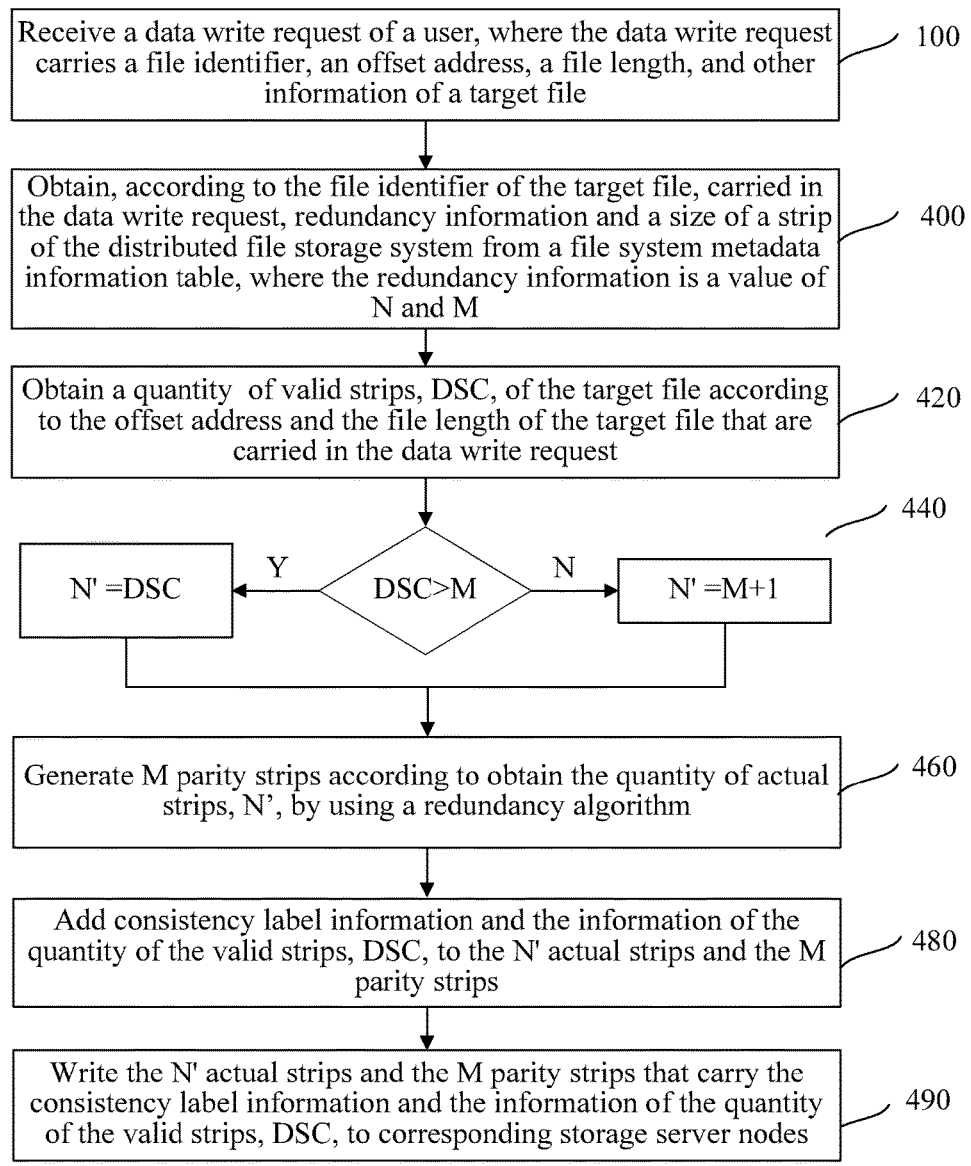
FIG. 4 is a schematic flowchart of a method in which a data processing request is a data write request according to an embodiment of the present disclosure.

Detailed description is provided below by using an example in which the data processing request is a data write request, and a process of an implementation method is shown in FIG. 4. A distributed file storage system to which the method is applicable is described still by using the distributed file storage system 10 shown in FIG. 1 as an example.

In the distributed file storage system 10 shown in FIG. 1, the storage server node 1 to the storage server node 8 are interconnected by using a network with low latency and high throughput to form a cluster. The client agent 30 is deployed on an application server 20 and implements communication between user data and the cluster by using the front-end switch 50. The storage server nodes 101 in the cluster implement internal communication by using the back-end switch 60. The client agent 30 may also be deployed on each storage server node 101 in the distributed file storage system 10, and a function of the client agent 30 is similar to a function of the client agent 30 deployed on the application server 20 and is not additionally described.

An N+M redundancy protection mechanism is used for file data stored in the distributed file storage system 10. M is a quantity of parity strips used by the distributed file storage system 10 to perform redundancy protection on stored file data, and a specific value of M may be set according to a service requirement. N is a quantity of data strips that are obtained by means of division when striping is performed on the file data, and N is calculated according to a quantity of storage server nodes in the distributed file storage system 10 and the value of M, or may be set to a fixed value according to a service requirement. A same value of N and a same value of M may be set in the distributed file storage system 10 for all directories, or a different value of N and a different value of M may be set for a certain directory, which is determined according to a service requirement. In this embodiment, a same N and a same M are used as an example for description. N and M of the distributed file storage system 10 are stored in a file data metadata information table of the distributed file storage system 10. M and N for a directory are stored in a directory metadata table. The sum of N and M may be equal to a total quantity of the storage server nodes in the distributed file storage system 10, or multiple strips may be stored on one storage server node 101, that is, the sum of N and M may also be greater than the total quantity of the storage server nodes. In this embodiment, N of the distributed file storage system 10 is 6, and M is 2. A data write request is sent, through a standard portable operating system interface, to the file system client agent 30 that is deployed on the application server 20. The client agent 30 processes the data write request, and then communicates with the storage server nodes 101 by using the front-end switch 50. If the client agent 30 is deployed on a storage server node 101, the application server 20 sends the data write request to the client agent 30 on the corresponding storage server node 101 by using the front-end switch 50, and then the client agent 30 on the storage server node 101 processes the data write request, and communicates with the storage server nodes 101 in the cluster by using the back-end switch 60.

When file data of a user needs to be written to the distributed file storage system 10, the user initiates a data write request to the client agent 30 on the application server 20 by using a client. For convenience of description, the file data to be written is referred to as a target file. The client agent 30 receives the data write request which carries a FID, an offset address, a file length, and other information of the target file, as shown in Block 100 in FIG. 4. In this embodiment, the FID, is 485, the offset address is 0 K, and the file length is 160 K. The client agent 30 obtains redundancy information and a size of a strip of the distributed file storage system from a file system metadata information table according to the file identifier of the target file, where the redundancy information is values of N and M, as shown in Block 400 in FIG. 4. In this embodiment, the value of N is 6, the value of M is 2, and the size of the strip is 128 K.

The client agent 30 performs striping processing on the target file according to the offset address and the file length information that are carried in the data write request and the acquired size of the strip, to obtain a quantity of valid strips, DSC, of the target file, as shown in Block 420 in FIG. 4. In this embodiment, the offset address of the target file is 0 K, a file length is 160 K, and the size of the strip is 128 K; therefore, the client agent performs striping processing on the target file, to generate 2 valid strips.

The client agent 30 compares the quantity of the valid strips, DSC, that are obtained by means of division when the striping processing is performed on the target file with the acquired quantity of the parity strips, M, as shown in Block 440 in FIG. 4. When the quantity of the valid strips, DSC, is less than or equal to the quantity of the parity strips, M, that is, DSC≤M, a quantity of actual strips, N', of the target file is equal to the quantity of the parity strips, M, plus 1, that is, N'=M+1. In this case, an empty strip needs to be added, and a quantity of the empty strips, ESC, that need to be added is equal to the quantity of the actual strips N' minus the quantity of the valid strips, DSC, that is, ESC=N'−DSC= (M+1)−DSC. When the quantity of the valid strips, DSC, is greater than the quantity of the parity strips M, that is, DSC>M, the quantity of the actual strips N' of the target file is equal to the quantity of the valid strips DSC, that is, N'=DSC, and no empty strip needs to be added in this case.

In this embodiment, the quantity of the valid strips, DSC, is 2, and the quantity of the parity strips, M, is 2; therefore, the quantity of the valid strips, DSC, is equal to the quantity of the parity strips M, that is, DSC=M. In this case, the quantity of the actual strips N' of the target file is the quantity of the parity strips, M, plus 1, that is, N'=M+1, and N'=2+1=3. When the striping processing is performed on the target file, the target file needs to be divided into 3 strips, that is, the quantity of the actual strips N' of the target file is 3; because the quantity of the valid strips, DSC, of the target file obtained by means of division is 2, only 1 empty strip needs to be added in this case. However, in an existing implementation manner, the target file needs to have 6 data strips, and in a case in which there are 2 valid strips, 4 empty strips need to be added. As can be seen, by using the method of the present disclosure, the quantity of the empty strips can be greatly reduced.

If the quantity of the valid strips, DSC, that are obtained by means of division when striping is performed on the target file is 1 and the quantity of the parity strips, M, is 2, the quantity of the valid strips, DSC, of the target file is less than the quantity of the parity strips, M, in this case, that is, DSC<M. In this case, the quantity of the actual strips N' of the target file is the quantity of the parity strips, M, plus 1, that is, N'=M+1, and N'=2+1=3. When the striping is performed on the target file, the target file needs to be divided into 3 strips, that is, the quantity of the actual strips N' of the target file is 3; because the quantity of the valid strips, DSC, of the target file obtained by means of division is 1, 2 empty strips need to be added in this case.

In addition, there is a case in which the quantity of the valid strips, DSC, that are obtained by means of division when striping is performed on the target file is greater than the quantity of the parity strips M, that is, DSC>M. For example, the quantity of the valid strips, DSC, that are obtained by means of division when the client agent performs striping processing on the target file is 5; in this case, DSC>M, and the quantity of the actual strips N' is equal to DSC, that is N'=5, and no empty strip needs to be added.

As can be seen, by using the method of the present disclosure, a quantity of actual strips N' of a target file can be dynamically adjusted according to a size of the target file, which not only can ensure that the target file can be correctly read in any case, but also can effectively reduce a quantity of empty strips. Correspondingly, read-write IO operations on the empty strips are reduced, and the IO performance of a distributed file storage system is improved.

The client agent 30 generates M parity strips according to obtained the quantity of actual strips, N', by using a redundancy algorithm (as shown in Block 460 in FIG. 4), and adds consistency label information and the information of quantity of the valid strips, DSC, to N' actual strips and the M parity strips, as shown in Block 480 in FIG. 4. The consistency label information may be information about a same timestamp or version number.

For example, the client agent 30 performs striping processing on the target file to obtain valid strips D1 and D2. In this case, the quantity of the valid strips, DSC, of the target file is 2. The quantity of the valid strips 2 is compared with a quantity of the parity strips 2, the quantity of the valid strips, DSC, is equal to the quantity of the parity strips M, and the quantity of the actual strips N' of the target file is 3; in this case, one empty strip D3 needs to be added. The client agent generates parity strips D7 and D8 according to the strips D1, D2, and D3, and adds a timestamp T1 and the quantity of the valid strips, DSC, being equal to 2 to the strips D1, D2, D3, D7, and D8.

The client agent 30 writes the actual strips and the parity strips that carry the consistency label information and the quantity of the valid strips, DSC, to corresponding storage server nodes 101, as shown in Block 490 in FIG. 4. A method for specifically determining a storage server node 101 to which each strip should be written is similar to an existing implementation manner and is not described in detail again. The client agent 30 stores the quantity of the actual strips N', the quantity of the parity strips M, and distribution information of the strips of the target file to a file metadata information table, so as to help read the strips of the target file from corresponding storage server nodes 101 when the target file is read.

For example, the client agent 30 stores D1, D2, and D3 that have the timestamp T1 and the quantity of the valid strips, DSC, being equal to 2, to the storage server node 1, the storage server node 2, and the storage server node 3 respectively, and stores D7 and D8 that have the timestamp T1 and the quantity of the valid strips, DSC, being equal to 2 to the storage server node 7 and the storage server node 8 respectively. The client agent 30 stores the quantity of the actual strips N' being equal to 3, the quantity of the parity strips, M, being equal to 2, and the distribution information of the strips of the target file to the file metadata information table.

For the distributed file storage system 10 in which the client agent 30 is deployed on a storage server node 101, the client agent 30 implements an operation, such as storage of the strips, by using the back-end switch 60, and a specific implementation manner is the same as an existing implementation manner and is not additionally described herein.

As can be seen, in a scenario in which a target file is small file data, when a quantity of valid strips DSC that are obtained by means of division when striping processing is performed on the target file is less than a quantity of parity strips, M, of a distributed file storage system, a quantity of actual strips N' is equal to the quantity of the parity strips, M, plus 1, and a value of M is generally small; in this case, only a few empty strips need to be added. When the quantity of the valid strips, DSC, that are obtained by means of division when the striping processing is performed on the target file is greater than the quantity of the parity strips, M, of the distributed file storage system, the quantity of the actual strips N' is equal to the quantity of the valid strips, DSC, in this case, and no empty strip needs to be added. In this way, when a target file is small file data, striping processing is performed on the target file to generate N' actual strips, instead of a quantity of data strips of N a distributed file storage system in the prior art, thereby reducing a quantity of empty strips, effectively reducing write operations on the empty strips, reducing IO operations in the distributed file storage system, and improving the performance of the distributed file storage system. Especially in a large-scale distributed file storage system, an effect of improving the performance of the distributed file storage system is more obvious.

Figure 5A:
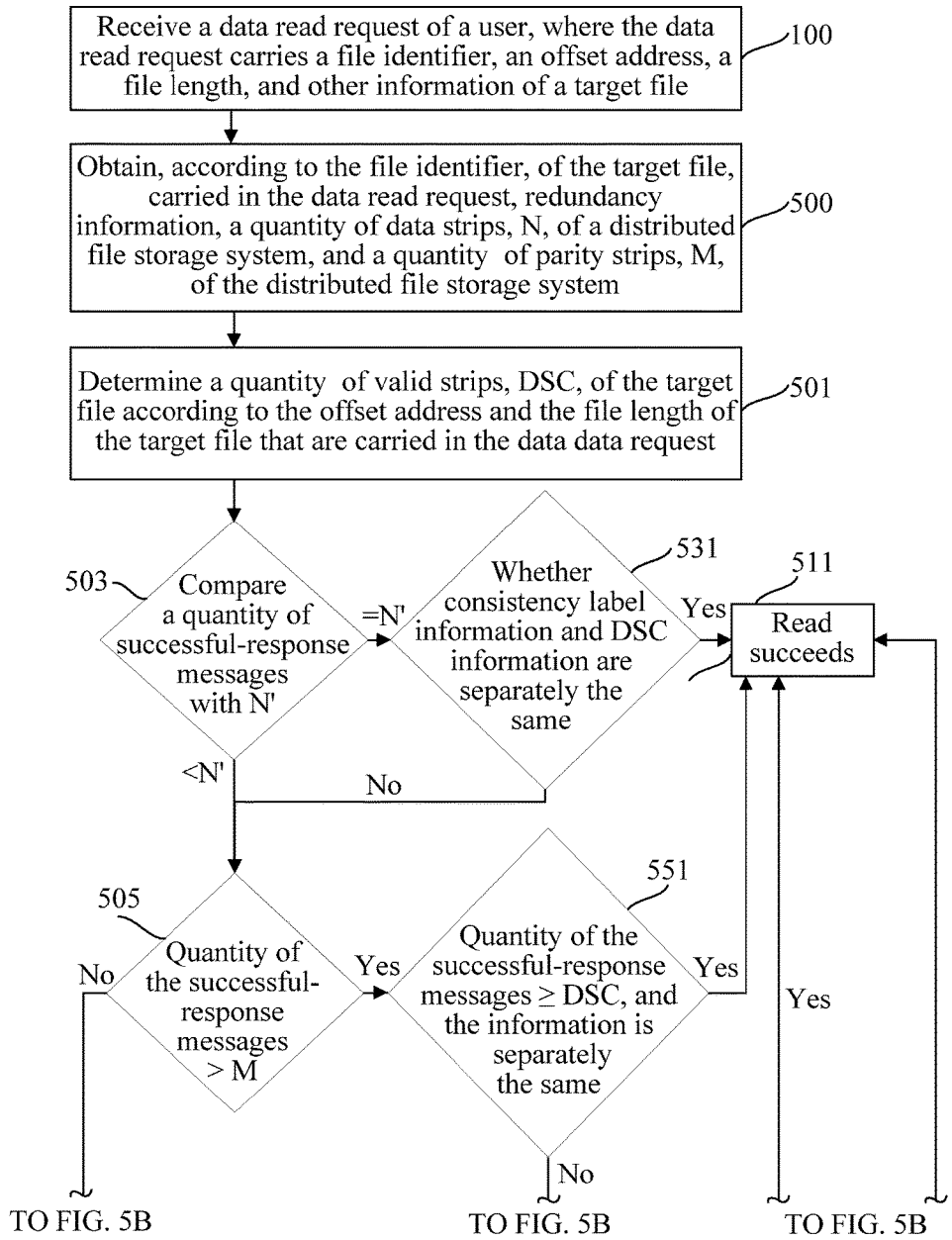
FIG. 5A and FIG. 5B are a schematic flowchart of a method in which a data processing request is a data read request according to an embodiment of the present disclosure.
Figure 5B:
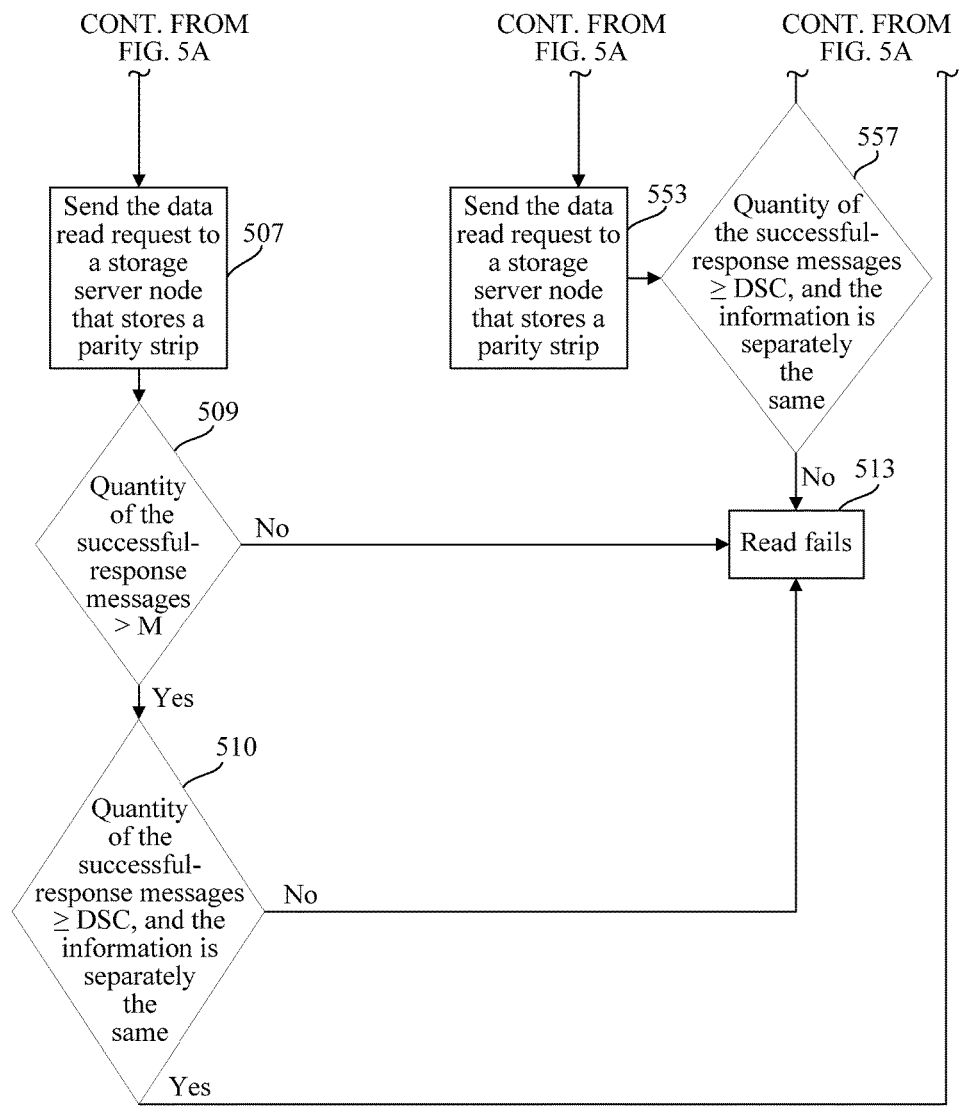

In the following embodiment, detailed description is provided by using an example in which the data processing request is a data read request, and a process of an implementation method is shown in FIG. 5A and FIG. 5B. A data read request refers to a request that a user needs to read a target file. The structure of a distributed file storage system 10 is the same as the structure of the distributed file storage system 10 to which a data processing request that is a data write request applies, which is shown in FIG. 1. In this method embodiment, it is also used as an example for description that N is 6 and M is 2. Values of N and M may also be set to other numerical values as required, and an implementation principle thereof is the same and is not additionally described. In addition, in this embodiment, description is also provided by using an example in which a client agent 30 is deployed on an application server 20.

When a user needs to read stored file data from the distributed file storage system 10, the user initiates a data read request to the client agent 30 on the application server 20. For clear description, the file data to be read by the user is referred to as a target file. The client agent 30 receives the data read request that carries a FID, an offset address, a file length, and other information of the target file, as shown in Block 100 in FIG. 5A. After receiving the data read request, the client agent 30 obtains redundancy information of the distributed file storage system 10 from a file system metadata information table according to the FID, that is carried in the data read request, where the redundancy information is the values of N and M, as shown in Block 500 in FIG. 5A. M is a quantity of parity strips used by the distributed file storage system to perform redundancy protection on stored file data, and a specific value of M may be set according to a service requirement. N is a quantity of data strips that are obtained by means of division when striping processing is performed on the file data, and N is calculated according to a quantity of storage server nodes in the distributed file storage system and the value of M, or may be set to a fixed value according to a service requirement. A same value of N and a same value of M may be set in the distributed file storage system 10 for all directories, or a different value of N and a different value of M may be set for a certain directory, which is determined according to a service requirement. In this embodiment, a same N and a same M are used as an example for description. N and M of the distributed file storage system 10 are stored in a file data metadata information table of the distributed file storage system 10. M and N for a directory are stored in a directory metadata table. In this embodiment, the value of N of the distributed file storage system 10 is 6, and the value of M of the distributed file storage system 10 is 2.

After receiving the data read request, the client agent 30 on the application server 20 may acquire the quantity of the data strips N, the quantity of the parity strips M, and a size of a strip of the target file according to the file identifier. The client agent calculates a quantity of valid strips DSC of the target file according to the offset address and the file length information that are carried in the data read request and the size of the strip, as shown in Block 501 in FIG. 5A. A specific calculation method is similar to the method in the solution for the data write request and is not additionally described herein. In the following steps, it is used as an example for description that the quantity of the valid strips of the target file is 2, a quantity of actual strips of the target file is 3, and the quantity of the parity strips of the target file is 2. The client agent 30 may find distribution information of the strips of the target file by using the FID, carried in the data read request, and determine, according to the distribution information, storage server nodes on which the actual strips and the parity strips of the target file are stored, and may further determine, according to a calculated quantity of the actual strips N' and the quantity of the parity strips, a location of server nodes that store the actual strips and the parity strips of the target file.

The client agent 30 generates a new data block read request, and sends the data block read request to a determined storage server node 101. The data block read request is used to read a strip of the target file on the storage server node 101.

The client agent 30 may send the data block read request to all determined storage server nodes 101, or may send the data block read request to all storage server nodes 101 in the distributed file storage system 10. The client agent 30 may also send the data block read request first to a storage server node 101 that stores an actual strip of the target file; when a response fed back by the storage server node 101 that stores the actual strip of the target file indicates that the target file cannot be correctly read, the client agent 30 sends the data block read request to a storage server node 101 that stores a parity strip of the target file. In this embodiment, the last case is used for description, that is, the data block read request is first sent to the storage server node 101 that stores the actual strip of the target file; when the response fed back by the storage server node 101 that stores the actual strip of the target file indicates that the actual strip cannot be correctly read, the data block read request is sent to the storage server node 101 that stores the parity strip of the target file.

After receiving the data block read request, the storage server node 101 determines, according to the file identifier carried in the data block read request, whether a stored corresponding strip can be read; if the stored corresponding strip can be read, the storage server node 101 sends a successful-response message indicating that the strip can be read to the client agent, where the successful-response message carries consistency label information of the strip and information about the quantity of the valid strips DSC; if no corresponding strip is stored or the stored corresponding strip is damaged and unreadable, the storage server node 101 sends an unsuccessful-response message indicating that the strip cannot be read to the client agent.

The client agent 30 sends the data block read request to the storage server node 101 that stores the actual strip of the target file, and receives response message of the data block read request returned by each storage server node 101. If a quantity of successful-response messages is the same as the quantity of the actual strips N', and consistency label information and information about the quantity of the valid strips, DSC, in all the successful-response messages are separately the same (as shown in Block 531 in FIG. 5A), the target file can be read in this case (as shown in Block 511 in FIG. 5A); the client agent 30 reads the actual strips, constructs the target file, and sends the target file to the user. An implementation method of reading the actual strips and constructing the target file by the client agent 30 is the same as an existing method and is not additionally described herein.

For example, after receiving the data read request, the client agent 30 searches the metadata information table according to the file identifier of the target file carried in the data read request, to obtain that the quantity of the data strips N of the target file is 6 and the quantity of the parity strips, M, is 2, and obtain the distribution information of the strips of the target file, that is, an actual strip D1 is stored on a storage server node 1, an actual strip D2 is stored on a storage server node 2, an actual strip D3 is stored on a storage server node 3, a parity strip D7 is stored on a storage server node 7, and a parity strip D8 is stored on a storage server node 8. The client agent 30 calculates the quantity of the valid strips, DSC, of the target file and the quantity of the actual strips N' of the target file according to the information carried in the data read request and the information obtained by using the file identifier of the target file. For a detailed calculation method, refer to related description in the process of the data write request.

The client agent 30 generates a new data block read request, where the data block read request is used to read a strip of the target file from a storage server node 101.

The client agent 30 sends the data block read request to the storage server nodes 1 to 3 that store actual strips of the target file. The storage server nodes 1 to 3 return successful-response messages indicating that the actual strips can be read, where the successful-response messages each carry timestamp information of a strip and information about the quantity of the valid strips. The client agent 30 determines whether timestamp information and information about the quantity of the valid strips that are carried in all the response messages are separately the same. If the timestamp information and the information about the quantity of the valid strips that are carried in all the response messages are separately the same, the client agent 30 reads the actual strips, constructs the target file, and sends the target file to the user. In this embodiment of the present disclosure, the client agent 30 only needs to read 3 strips whose consistency label information and information about the quantity of the valid strips, DSC, are all separately the same. However, in the prior art, N (N=6) strips that have same consistency label information and a same information about the quantity of valid strips, DSC, need to be read, so as to obtain an expected target file. As a result, 3 more empty strips need to be read, thereby causing a waste of IO operations in the distributed file storage system. In a large-scale distributed file storage system, a value of the quantity of the data strips N is larger, and correspondingly a quantity of empty strips that need to be operated is larger, which causes a greater burden on the IO performance of the distributed file storage system. By using the method mentioned in this embodiment, read operations on empty strips can be effectively reduced, thereby improving the IO performance of the entire distributed file storage system.

If the quantity of the successful-response messages fed back by the storage server nodes 101 that store the actual strips of the target file is less than the quantity of the actual strips N', or a quantity of successful-response messages that carry same consistency label information and same information about the quantity of the valid strips, DSC, is less than the quantity of the actual strips N' (as shown in block 503 of FIG. 5A), it is further determined whether the quantity of the successful-response messages or the quantity of the successful-response messages that carry the same consistency label information and the same information about the quantity of the valid strips, DSC, is greater than the quantity of the parity strips, M, of the distributed file storage system, as shown in Block 505 in FIG. 5A.

If the quantity of the successful-response messages and the quantity of the successful-response messages that carry the same consistency label information and the same information about the quantity of the valid strips are both greater than the quantity of the parity strips, M, of the distributed file storage system, the client agent 30 determines whether the quantity of the successful-response messages and the quantity of the successful-response messages that carry the same consistency label information and the same information about the quantity of the valid strips are both greater than or equal to the quantity of the valid strips, DSC, of the target file (as shown in Block 551 in FIG. 5A); if they are greater than or equal to the quantity of the valid strips, DSC, of the target file, the expected target file can be read in this case (as shown in Block 511 in FIG. 5A), and the client agent 30 performs corresponding processing, where a specific processing method is the same as an existing implementation method and is not additionally described herein. If the quantity of the successful-response messages or the quantity of the successful-response messages that carry the same consistency label information and the same information about the quantity of the valid strips is less than the quantity of the valid strips, DSC, of the target file, the client agent 30 sends the data block read request to a storage server node 101 that stores a parity strip of the target file (as shown in Block 553 in FIG. 5B), and receives a response message of the storage server node 101 that stores the parity strip of the target file. The client agent 30 then determines whether the quantity of all the successful-response messages and the quantity of the successful-response messages that carry the same consistency label information and the same information about the quantity of the valid strips are both greater than or are equal to the quantity of the valid strips, DSC, of the target file (as shown in Block 557 in FIG. 5B); if they are greater than or equal to the quantity of the valid strips, DSC, of the target file, the client agent 30 can read the expected target file in this case; if they are less than the quantity of the valid strips, DSC, of the target file, the client agent 30 feeds back, to the user, a message indicating unsuccessful read (as shown in Block 513 in FIG. 5B).

If the quantity of the successful-response messages or the quantity of the successful-response messages that carry the same consistency label information and the same information about the quantity of the valid strips is less than or equal to the quantity of the parity strips, M, of the distributed file storage system, the client agent 30 sends the data block read request to a storage server node 101 that stores a parity strip of the target file (as shown in Block 507 in FIG. 5B), and receives a response message of the storage server node 101 that stores the parity strip of the target file. The client agent 30 then determines whether the quantity of all the successful-response messages or the quantity of the successful-response messages that carry the same consistency label information and the same information about the quantity of the valid strips is greater than the quantity of the parity strips, M, of the distributed file storage system (as shown in Block 509 in FIG. 5B). If the quantity of all the successful-response messages and the quantity of the successful-response messages that carry the same consistency label information and the same information about the quantity of the valid strips are both greater than the quantity of the parity strips, M, of the distributed file storage system, the client agent 30 determines whether the quantity of all the successful-response messages or the quantity of the successful-response messages that carry the same consistency label information and the same information about the quantity of the valid strips is greater than or equal to the quantity of the valid strips, DSC, of the target file (as shown in Block 510 in FIG. 5B). If the quantity of all the successful-response messages and the quantity of the successful-response messages that carry the same consistency label information and the same information about the quantity of the valid strips are both greater than or equal to the quantity of the valid strips, DSC, of the target file, the expected target file can be read in this case; if the quantity of all the successful-response messages or the quantity of the successful-response messages that carry the same consistency label information and the same information about the quantity of the valid strips is less than the quantity of the valid strips, DSC, of the target file, a message indicating unsuccessful read is fed back to the user. If the quantity of all the successful-response messages or the quantity of the successful-response messages that carry the same consistency label information and the same information about the quantity of the valid strips is less than the quantity of the parity strips, M, of the distributed file storage system, the client agent 30 feeds back, to the user, a message indicating unsuccessful read.

Description is provided below by using an example in which the quantity of the valid strips, DSC, of the target file is 2, the quantity of the actual strips N' of the target file is 3, and the quantity of the parity strips, M, of the target file is 2. A valid strip D1 of the target file is stored on the storage server node 1, a valid strip D2 of the target file is stored on the storage server node 2, an empty strip D3 of the target file is stored on the storage server node 3, the parity strip D7 is stored on the storage server node 7, and the parity strip D8 is stored on the storage server node 8. In the strips D1, D2, D3, D7, and D8, consistency label information is a timestamp T1, and information about the quantity of the valid strips is DSC=2. The client agent 30 first sends a received data block read request of a user to the storage server node 1, the storage server node 2, and the storage server node 3. When the storage server node 1, the storage server node 2, and the storage server node 3 all send a successful-response message to the client agent 30, the client agent 30 determines that there are 3 successful-response messages of strips, and timestamps and DSCs that are carried in the successful-response messages are separately the same, that is, the quantity of the successful-response messages and the quantity of the successful-response messages that carry the same consistency label information and the same information about the quantity of the valid strips is the same as the quantity of the actual strips, 3, of the target file; in this case, the expected target file can be read, and the client agent 30 reads the strips D1, D2, and D3, constructs the target file, and sends the target file to the user. If the storage server node 1 and the storage server node 3 both feed back a successful-response message, where the successful-response messages separately carry the timestamp T1 and the information about the quantity of the valid strips DSC=2 of the strips D1 and D3, but the storage server node 2 feeds back an unsuccessful-response message because the stored strip D2 is damaged in this case, there are only 2 strips for which a successful response is returned, that is, the client agent receives 2 successful-response messages, whose quantity is less than the quantity of the actual strips, 3, of the target file, and the client agent 30 needs to further compare the quantity of the successful-response messages, 2, with the quantity of the parity strips, 2, of the distributed file storage system. The quantity of the successful-response messages, 2, is the same as the quantity of the parity strips, 2, of the distributed file storage system, and therefore the client agent 30 sends the data block read request to the storage server node 7 and the storage server node 8. The storage server node 7 and the storage server node 8 both feed back a successful-response message to the client agent 30, where the successful-response messages separately carry the timestamp T1 and the information about the quantity of the valid strips DSC=2 of the strips D7 and D8. The client agent 30 compares the sum of the quantities of the received successful-response messages that have a same timestamp and same information about the quantity of the valid strips (the sum of a quantity of successful-response messages for the valid strips and a quantity of successful-response messages for the parity strips (1+2=3)) with the quantity of the valid strips, 2, of the target file. In this case, the quantity of the successful-response messages that have the same timestamp and the same information about the quantity of the valid strips is greater than the quantity of the valid strips, 2, of the target file; in this case, the expected target file can be read, and the client agent 30 reads the strips D1, D7, and D8, constructs the target file, and sends the target file to the user.

Figure 6:
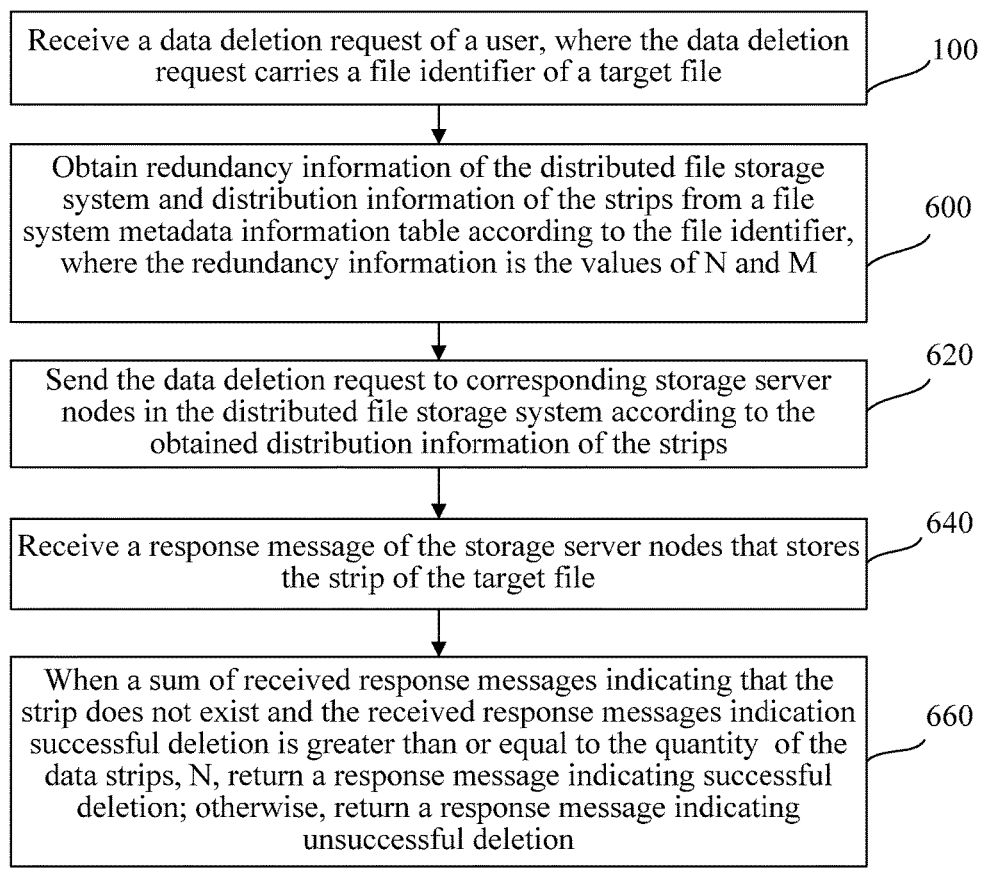
FIG. 6 is a schematic flowchart of a method in which a data processing request is a data deletion request according to an embodiment of the present disclosure.

The data processing request may also be a data deletion request or a data truncation request, and an implementation process is shown in FIG. 6. The structure of a distributed file storage system 10 to which the data processing request applies is the same as that of other data processing requests, which is shown in FIG. 1. An implementation method of the data deletion request is similar to an implementation method of the data truncation request; the data deletion request is used as an example below for description, and the implementation method of the data truncation request is not additionally described. In this embodiment, a value of N of the distributed file storage system is 6, and a value of M is 2. The values of N and M may also be set to other numerical values as required, and an implementation principle thereof is the same and is not additionally described. In addition, in this embodiment, description is also provided by using an example in which a client agent 30 is deployed on an application server 20.

A user initiates a data deletion request to the client agent 30 on the application server 20, and file data to be deleted by the user is referred to as a target file, where the data deletion request is used to delete related strips of the target file that are stored on storage server nodes. The client agent 30 receives the data deletion request which carries information about a FID, of the target file (as shown in Block 100 in FIG. 6). After receiving the data deletion request, the client agent 30 obtains redundancy information of the distributed file storage system and distribution information of the strips from a file system metadata information table according to the FID, that is carried in the data deletion request, where the redundancy information is the values of N and M (as shown in Block 600 in FIG. 6). M is a quantity of parity strips used by the distributed file storage system to perform redundancy protection on stored file data, and a specific value of M may be set according to a service requirement. N is a quantity of data strips that are obtained by means of division when striping is performed on the file data, and N is calculated according to a quantity of storage server nodes in the distributed file storage system and the value of M, or may be set to a fixed value according to a service requirement. A same value of N and a same value of M may be set in the distributed file storage system for all directories, or a different value of N and a different value of M may be set for a certain directory, which is determined according to a service requirement. In this embodiment, a same N and a same M are used as an example for description. N and M of the distributed file storage system are stored in a file data metadata information table of the distributed file storage system. M and N for a directory are stored in a directory metadata table.

Herein, it is used as an example for description that the quantity of the parity strips, M, of the distributed file storage system is 2, and the quantity of the data strips, N, of the distributed file storage system is 6.

The client agent sends the data deletion request to corresponding storage server nodes 101 in the distributed file storage system 10 according to the obtained distribution information of the strips (as shown in Block 620 in FIG. 6). If the storage server node 101 that receives the data deletion request does not have a strip of the target file or only has an empty strip of the target file, a response message indicating that the object to be deleted does not exist is returned to the client agent 30. If the storage server node 101 that receives the data deletion request stores a valid strip or a parity strip of the target file, a response message indicating successful deletion is returned to the client agent 30 after the strip is deleted. If deletion cannot be performed or complete deletion is not performed, a response message indicating unsuccessful deletion is fed back to the client agent 30. After receiving response messages of storage server nodes (as shown in Block 640 in FIG. 6), the client agent 30 determines whether the sum of received response messages indicating that the object to be deleted does not exist and received response messages indicating successful deletion is greater than or equal to the quantity of the data strips, N, of the distributed file storage system. In other words, the quantity of strips of the target file that are stored in the distributed file storage system should not exceed the quantity of the parity strips, M, of the distributed file storage system, so as to ensure that the target file cannot be read from the distributed file storage system after the target file is deleted. If the sum of received response messages indicating that the strip does not exist and the received response messages indicating successful deletion is greater than or equal to the quantity of the data strips, N, of the distributed file storage system, the client agent 30 returns, to the user, a response message indicating successful deletion; Otherwise, the client agent 30 returns, to the user, a response message indicating unsuccessful deletion (as shown in Block 660 in FIG. 6).

For example, after receiving the data deletion request, the client agent 30 searches the metadata information table according to the file identifier of the target file carried in the data deletion request, to obtain that the quantity of the parity strips, M, of the distributed file storage system is 2 and a quantity of data strips, N, of the distributed file storage system is 6, and obtain the distribution information of the strips. The client agent 30 sends the received data deletion request to each corresponding storage server node 101 in the distributed file storage system 10 according to the distribution information of the strips. For example, a storage server node 1 stores a valid strip D1 of the target file, a storage server node 2 stores a valid strip D2 of the target file, and the client agent 30 sends the received data deletion request to the storage server node 1 and the storage server node 2; and the storage server node 1 and the storage server node 2 delete the strips D1 and D2 separately, and return, to the client agent 30, a response message indicating successful deletion after the deletion succeeds. A storage server node 3 stores an empty strip of the target file, and a storage server node 4, a storage server node 5, and a storage server node 6 do not have any strip of the target file. After receiving the data deletion request, the storage server nodes 3 to 6 each feedback, to the client agent 30, a response message indicating that the object to be deleted does not exist. A storage server node 7 and a storage server node 8 store parity strips of the target file, and therefore delete corresponding strips D7 and D8 separately, and return, to the client agent 30, a response message indicating successful deletion after the deletion succeeds. The client agent 30 receives 4 response messages indicating successful data deletion and 4 response messages indicating that the object to be deleted does not exist, which are returned by the storage server nodes 101. A total quantity of the received response messages indicating successful deletion and the received response message indicating that the object to be deleted does not exist is 8, which is greater than the quantity of the data strips of the distributed file storage system, and therefore the client agent 30 returns, to the user, a response indicating successful deletion. In a case in which the data processing request is a data deletion request, only when the sum of a quantity of returned response messages indicating successful deletion and a quantity of returned response messages indicating that the object to be deleted does not exist is greater than or equal to the quantity of the data strips N of the distributed file storage system, the client agent can return, to the user, a message indicating successful deletion. In a data deletion operation, the quantity of the data strips N of the distributed file storage system needs to be compared with the sum, and in the case of a data write request and a data read request, a quantity of actual strips, N', of the target file needs to be compared with the sum. This mainly intends to ensure that the target file cannot be read again after the strips of the target file are deleted.

Similarly, a method for deleting a data stripe due to truncation is the same as a method for deleting a data strip and is not additionally described herein.

By using the method provided in the present disclosure, when a file is to be written to a distributed file storage system, an N'+M redundancy protection mechanism is used according to a size of the file to be written, that is, when striping is performed on the target file, a different quantity of strips are generated according to the size of the target file, that is, a quantity of actual strips, N', are generated according to the size of the target file. This not only can ensure that an expected target file can be acquired correctly in any case, but also can effectively reduce a quantity of empty strips in the distributed file storage system, reduce a quantity of disk IO operations and network IO operations in the distributed file storage system, and improve the performance of the distributed file storage system.

The present disclosure further provides a device for implementing a data processing method in a distributed file storage system. In this embodiment of the present disclosure, the device may be a client agent. As shown in FIG. 1, the device may be deployed on an application server that is connected to the distributed file storage system, or may be deployed on a storage server node in the distributed file storage system.

As shown in FIG. 1, a distributed file storage system 10 includes multiple storage server nodes 101, where the multiple storage server nodes 101 are interconnected by using a network (for example, an IB network, or a 10G Ethernet) with low latency and high throughput to form a cluster. The distributed file storage system 10 further includes a front-end switch 50 and a back-end switch 60. The front-end switch 50 is configured to implement external service requesting and data exchange between user data and the cluster. The back-end switch 60 is configured to implement internal requesting and data exchange between the storage server nodes 101 in the cluster. An application server 20 communicates with the distributed file storage system 10 by using the front-end switch 50.

When the device is deployed on the application server 20 that is connected to the distributed file storage system 10, each application directly accesses, by using a standard POSIX, a file system client agent CA 30 that is deployed on the application server 20. As a portal, which externally provides a service, of the distributed file storage system 10, the client agent 30 interacts with the storage server nodes 101 in the cluster after receiving a request of the application. When the device is deployed on a storage server node 101 in the distributed file storage system, each application accesses a corresponding NAS Server by using a commonly used NAS protocol (such as NFS/CIFS) client, where the NAS server and the storage server are deployed together, and then the NAS server accesses a file system client agent that is deployed on the server node, to implement a storage service. In order to clearly describe an implementation principle of the present disclosure, the first access manner is used for specific description, and the second access manner uses a similar implementation principle.

In order to clearly describe a data processing manner of the device, description is provided below by using an example in which the device is a client agent.

A service system shown in FIG. 1 is used as an example. The service system includes 2 application servers 20, and the application servers 20 communicate with the distributed file storage system 10 by using the front-end switch 50. The client agent 30 is deployed on the application server 20, and a data processing request of a user is first sent to the client agent 30 on the application server 20, so that the client agent 30 performs corresponding processing on the data processing request. In a case in which the client agent 30 is deployed on a storage server node 101, after receiving the data processing request of the user, the application server 20 sends, by using the front-end switch 50, the data processing request to the client agent 30 on the corresponding storage server node 101, and the client agent 30 on the storage server node 101 processes the data processing request.

The storage server nodes 101 in the distributed file storage system 10 are interconnected to form a cluster, and constitute a large-scale network RAID, and an N+M redundancy protection mechanism is used for stored data. M is a quantity of parity strips used by the distributed file storage system 10 to perform redundancy protection on stored file data, and a specific value of M may be set to a fixed value according to a service requirement. N is a quantity of data strips that are obtained by means of division when striping is performed on the file data, and N is calculated according to a quantity of storage server nodes in the distributed file storage system 10 and the value of M, or may be set to a fixed value according to a service requirement. A same value of N and a same value of M may be set in the distributed file storage system 10 for all directories, or a different value of N and a different value of M may be set for a certain directory, which is determined according to a service requirement. N and M of the distributed file storage system are stored in a file data metadata information table of the distributed file storage system. To make description clearer, one piece of file data to be processed is referred to as one data stripe, and when striping is performed on one data stripe, the data stripe is divided into N data strips, and M parity strips are generated according to a redundancy algorithm.

Figure 7:
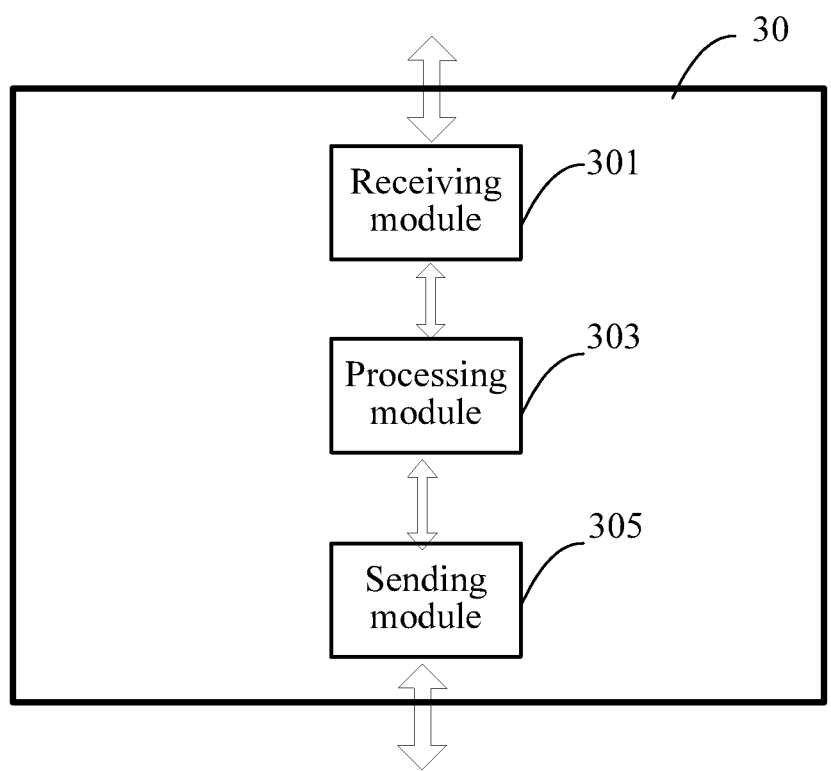
FIG. 7 is a schematic structural diagram of a device for implementing a data processing method in a distributed file storage system according to an embodiment of the present disclosure.

The client agent 30 includes a receiving module 301, a processing module 303, and a sending module 305, as shown in FIG. 7.

The receiving module 301 of the client agent 30 is configured to receive a data processing request sent by an application, where the data processing request carries a FID, an offset address, a file length, and other information of a target file. The target file is a file to be processed. The processing module 303 calculates a quantity of valid strips, DSC, of file data according to the offset address and the length information that are carried in the data processing request. A valid strip is a data strip that includes file data. In a scenario of small file data, a quantity of valid strips, DSC, that are obtained by means of division when striping is performed on the file data is less than a quantity of data strips, N, of the distributed file storage system. In the scenario of small file data, a larger-scale distributed file storage system 10 indicates a greater difference between the quantity of the valid strips, DSC, and the quantity of the data strips, N, of the distributed file storage system.

When the client agent 30 is deployed on a storage server node 101 in the distributed file storage system 10, after receiving a data processing request, the application server 20 sends the data processing request to the client agent 30 on a storage server node 101 by using the front-end switch 50. A method for sending the data processing request to the client agent 30 on the storage server node 101 by the application server 20 is similar to an existing method and is not described in detail again. A method for processing the data processing request by the client agent 30 on the storage server node 101 is similar to a processing manner of the client agent 30 on the application server 20 and is not additionally described.

The processing module 303 compares the calculated quantity of the valid strips, DSC, with the quantity of the parity strips, M. According to a majority rule of the redundancy algorithm, in order to ensure that expected file data can be acquired during processing no matter what fault occurs, a quantity of strips that exceeds the quantity of the parity strips, M, needs to be read. When the quantity of the valid strips, DSC, is less than or equal to the quantity of the parity strips, M, that is, DSC≤M, the quantity of the actual strips, N', is equal to the quantity of the parity strips, M, plus 1, that is, N'=M+1. A quantity difference between the quantity of the actual strips, N', and the quantity of the valid strips, DSC, needs to be complemented by adding an empty strip, that is, a quantity of empty strips that need to be added in this case is ESC=N'−DSC=(M+1)−DSC. This can reduce the quantity of the empty strips in the distributed file storage system, and correspondingly reduce read-write IO operations on the empty strips, thereby improving the IO performance of the distributed file storage system.

When the quantity of the valid strips, DSC, is greater than the quantity of the parity strips, M, that is, DSC>M, the quantity of the actual strips, N', is equal to the quantity of the valid strips, DSC, that is, N'=DSC. In this case, the quantity of the empty strips is 0; in other words, no empty strip needs to be added, thereby reducing the quantity of the empty strips in the distributed file storage system.

When the file data is large, the quantity of the valid strips, DSC, may be the same as the quantity of the data strips, N, of the distributed file storage system, and in this case, the quantity of the empty strips is 0, that is, no empty strip needs to be added.

The quantity of the actual strips, N', is dynamically adjusted according to a size of file data, and especially in a scenario of small file data, the quantity of the actual strips, N', instead of the quantity of the data strips, N, of the distributed file storage system, is used, so that the quantity of the empty strips in the distributed file storage system is effectively reduced. Correspondingly, read-write IO operations on the empty strips are reduced, and the IO performance of the distributed file storage system is improved.

Corresponding processing is performed on the N' actual strips. A specific processing manner varies according to different types of data processing requests.

The sending module 305 is configured to feed back a result of the processing performed by the processing module 303 to the user.

When the data processing request is a data write request, the receiving module 301 is configured to receive the data write request.

The processing module 303 performs striping processing on the target file according to an offset address and file length information that are carried in the data write request and an acquired size of a strip, to obtain a quantity of valid strips, DSC, of the target file.

The processing module 303 compares the quantity of the valid strips, DSC, that are obtained by means of division when striping is performed on the target file with the acquired quantity of the parity strips, M. When the quantity of the valid strips, DSC, is less than or equal to the quantity of the parity strips, M, that is, DSC≤M, a quantity of actual strips, N', of the target file is equal to the quantity of the parity strips, M, plus 1, that is, N'=M+1. In this case, an empty strip needs to be added, and a quantity of the empty strips, ESC, that need to be added is equal to the quantity of the actual strips, N', minus the quantity of the valid strips, DSC, that is, ESC=N'−DSC=(M+1)−DSC. When the quantity of the valid strips, DSC, is greater than the quantity of the parity strips, M, that is, DSC>M, the quantity of the actual strips, N', of the target file is equal to the quantity of the valid strips, DSC, that is, N'=DSC, and no empty strip needs to be added in this case.

The processing module 303 generates M parity strips according to obtained actual strips by using a redundancy algorithm, and adds consistency label information and the quantity of the valid strips, DSC, to N' actual strips and the M parity strips. The consistency label information may be information about a same timestamp or version number.

The processing module 303 writes the actual strips and the parity strips that carry the consistency label information and the quantity of the valid strips, DSC, to corresponding storage server nodes. A method for specifically determining a storage server node to which each strip should be written is similar to an existing implementation manner and is not described in detail again. The processing module 303 stores the quantity of the actual strips, N', the quantity of the parity strips, M, and distribution information of the strips of the target file to a file metadata information table, so as to help read the strips of the target file from a corresponding storage server node when the target file is read.

As can be seen, in a scenario in which a target file is small file data, when a quantity of valid strips, DSC, that are obtained by means of division when striping processing is performed on the target file is less than a quantity of parity strips, M, of a distributed file storage system, a quantity of actual strips, N', is equal to the quantity of the parity strips, M, plus 1, and a value of M is generally small; in this case, only a few empty strips need to be added. When the quantity of the valid strips, DSC, that are obtained by means of division when the striping processing is performed on the target file is greater than the quantity of the parity strips, M, of the distributed file storage system, the quantity of the actual strips, N', is equal to the quantity of the valid strips, DSC, in this case, and no empty strip needs to be added. In this way, when a target file is small file data, striping processing is performed on the target file to generate N' actual strips, instead of a quantity of data strips, N, of a distributed file storage system in the prior art, thereby reducing a quantity of empty strips, effectively reducing write operations on the empty strips, reducing IO operations in the distributed file storage system 10, and improving the performance of the distributed file storage system 10. Especially in a large-scale distributed file storage system 10, an effect of improving the performance of the distributed file storage system 10 is more obvious.

When the data processing request is a data read request, file data to be read by a user is referred to as a target file. The data read request is a request that strips of the target file that are stored on corresponding server nodes be read and that an original target file be constructed and restored.

The receiving module 301 is configured to receive the data read request, where the data read request carries a FID, an offset address, a file length, and other information of the target file. The processing module 303 obtains redundancy information of the distributed file storage system from a file system metadata information table according to the FID, that is carried in the data read request, where the redundancy information is values of N and M. M is a quantity of parity strips used by the distributed file storage system to perform redundancy protection on stored file data, and a specific value of M may be set according to a service requirement. N is a quantity of data strips that are obtained by means of division when striping is performed on the file data, and N is calculated according to a quantity of storage server nodes in the distributed file storage system and the value of M, or may be set to a fixed value according to a service requirement. A same value of N and a same value of M may be set in the distributed file storage system for all directories, or a different value of N and a different value of M may be set for a certain directory, which is determined according to a service requirement. In this embodiment, a same N and a same M are used as an example for description. N and M of the distributed file storage system are stored in a file data metadata information table of the distributed file storage system. M and N for a directory are stored in a directory metadata table.

The processing module 303 may search for the quantity of the data strips, N, the quantity of the parity strips, M, and a size of a strip of the target file according to the file identifier. The processing module 303 calculates a quantity of valid strips, DSC, of the target file according to the offset address and the file length information that are carried in the data read request and the size of the strip. A specific calculation method is similar to the method in the solution for the data write request and is not additionally described herein. The processing module 303 may find distribution information of the strips of the target file by using the file identifier carried in the data read request, and determine, according to the distribution information, storage server nodes on which the actual strips and the parity strips of the target file are stored, and may further determine, according to a calculated quantity of the actual strips, N', and the quantity of the parity strips, a location of a server node that stores the actual strips and the parity strips of the target file. The processing module 303 may send the data read request to all determined storage server nodes, or may send the data read request to all storage server nodes in the distributed file storage system. The processing module 303 may also send the data read request first to a storage server node that stores an actual strip of the target file; when a response fed back by the storage server node that stores the actual strip of the target file indicates that the target file cannot be correctly read, the processing module 303 sends the data read request to a storage server node 101 that stores a parity strip of the target file. In this embodiment, the last case is used for description, that is, the processing module 303 first sends the data read request to the storage server node that stores the actual strip of the target file; when the response fed back by the storage server node that stores the actual strip of the target file indicates that the target file cannot be correctly read, the data read request is sent to the storage server node that stores the parity strip of the target file.

The processing module generates a new data block read request, and sends the data block read request to a determined storage server node 101. The data block read request is used to read a strip of the target file on the storage server node 101.

After receiving the data block read request, the storage server node determines, according to the file identifier carried in the data block read request, whether a stored corresponding strip can be read; if the stored corresponding strip can be read, the storage server node sends a successful-response message indicating that the strip can be read to the processing module 303, where the successful-response message carries consistency label information of the strip and information about the quantity of the valid strips, DSC; if no corresponding strip is stored or the stored corresponding strip is damaged and unreadable, the storage server node sends an unsuccessful-response message indicating that the strip cannot be read to the processing module 303.

The processing module 303 sends the data block read request to the storage server node that stores the actual strip of the target file, and receives response message of the data block read request returned by each storage server node. If a quantity of successful-response messages is the same as the quantity of the actual strips, N', and consistency label information and the information about quantity of the valid strips, DSC, in all the successful-response messages are separately the same, the target file can be read in this case; the processing module 303 reads the actual strips, constructs the target file, and sends the target file to the user. An implementation method of reading the actual strips and constructing the target file by the processing module 303 is the same as an existing method and is not additionally described herein. If the quantity of the successful-response messages fed back by the storage server nodes that store the actual strips of the target file is less than the quantity of the actual strips, N', or a quantity of successful-response messages that carry same consistency label information and same information about the quantity of the valid strips is less than the quantity of the actual strips, N', it is further determined whether the quantity of the successful-response messages or the quantity of the successful-response messages that carry the same consistency label information and the same information about the quantity of the valid strips is greater than the quantity of the parity strips, M, of the distributed file storage system.

If the quantity of the successful-response messages and the quantity of the successful-response messages that carry the same consistency label information and the same information about the quantity of the valid strips are both greater than the quantity of the parity strips, M, of the distributed file storage system, the processing module 303 determines whether the quantity of the successful-response messages or the quantity of the successful-response messages that carry the same consistency label information and the same information about the quantity of the valid strips is greater than or equal to the quantity of the valid strips, DSC, of the target file; if the quantity of the successful-response messages and the quantity of the successful-response messages that carry the same consistency label information and the same information about the quantity of the valid strips are both greater than or equal to the quantity of the valid strips, DSC, of the target file, an expected target file can be read in this case, and the processing module 303 performs corresponding processing, where a specific processing method is the same as an existing implementation method and is not additionally described herein. If the quantity of the successful-response messages or the quantity of the successful-response messages that carry the same consistency label information and the same information about the quantity of the valid strips is less than the quantity of the valid strips, DSC, of the target file, the processing module 303 sends the data read request to a storage server node that stores a parity strip of the target file, and receives a response message of the storage server node that stores the parity strip of the target file. The processing module 303 then determines whether the quantity of all the successful-response messages or the quantity of the successful-response messages that carry the same consistency label information and the same information about the quantity of the valid strips is greater than or equal to the quantity of the valid strips, DSC, of the target file. If the quantity of all the successful-response messages and the quantity of the successful-response messages that carry the same consistency label information and the same information about the quantity of the valid strips are both greater than or equal to the quantity of the valid strips, DSC, of the target file, the expected target file can be read in this case; if the quantity of all the successful-response messages or the quantity of the successful-response messages that carry the same consistency label information and the same information about the quantity of the valid strips is less than the quantity of the valid strips, DSC, of the target file, a message indicating unsuccessful read is fed back to the user.

If the quantity of the successful-response messages or the quantity of the successful-response messages that carry the same consistency label information and the same information about the quantity of the valid strips is less than or equal to the quantity of the parity strips, M, of the distributed file storage system, the processing module 303 sends the data block read request to a storage server node that stores a parity strip of the target file, and receives a response message of the storage server node that stores the parity strip of the target file. The processing module 303 then determines whether the quantity of all the successful-response messages or the quantity of the successful-response messages that carry the same consistency label information and the same information about the quantity of the valid strips is greater than the quantity of the parity strips, M, of the distributed file storage system. If the quantity of all the successful-response messages and the quantity of the successful-response messages that carry the same consistency label information and the same information about the quantity of the valid strips are both greater than the quantity of the parity strips, M, of the distributed file storage system, the processing module 303 determines whether the quantity of all the successful-response messages or the quantity of the successful-response messages that carry the same consistency label information and the same information about the quantity of the valid strips is greater than or equal to the quantity of the valid strips, DSC, of the target file. If the quantity of all the successful-response messages and the quantity of the successful-response messages that carry the same consistency label information and the same information about the quantity of the valid strips are both greater than or equal to the quantity of the valid strips, DSC, of the target file, the expected target file can be read in this case; if the quantity of all the successful-response messages or the quantity of the successful-response messages that carry the same consistency label information and the same information about the quantity of the valid strips is less than the quantity of the valid strips, DSC, of the target file, a message indicating unsuccessful read is fed back to the user. If the quantity of all the successful-response messages or the quantity of the successful-response messages that carry the same consistency label information and the same information about the quantity of the valid strips is less than the quantity of the parity strips, M, of the distributed file storage system, a message indicating unsuccessful read is fed back to the user.

The data processing request may also be a data deletion request or a data truncation request. An implementation method of the data deletion request is similar to an implementation method of the data truncation request; the data deletion request is used as an example below for description, and the implementation method of the data truncation request is not additionally described.

File data to be deleted by a user is referred to as a target file, and the data deletion request is used to delete related strips of the target file that are stored on storage server nodes. The data deletion request carries information about a FID, of the target file. The receiving module 301 receives the data deletion request; the processing module 303 obtains redundancy information of the distributed file storage system and distribution information of the strips from a file system metadata information table according to the FID, that is carried in the received data deletion request, where the redundancy information is values of N and M. M is a quantity of parity strips used by the distributed file storage system to perform redundancy protection on stored file data, and a specific value of M may be set according to a service requirement. N is a quantity of data strips that are obtained by means of division when striping is performed on the file data, and N is calculated according to a quantity of storage server nodes in the distributed file storage system and the value of M, or may be set to a fixed value according to a service requirement. A same value of N and a same value of M may be set in the distributed file storage system for all directories, or a different value of N and a different value of M may be set for a certain directory, which is determined according to a service requirement. In this embodiment, a same N and a same M are used as an example for description. N and M of the distributed file storage system are stored in a file data metadata information table of the distributed file storage system. M and N for a directory are stored in a directory metadata table.

The processing module 303 sends the data deletion request to a corresponding storage server node in the distributed file storage system according to the obtained distribution information of the strips. If the storage server node that receives the data deletion request does not have a strip of the target file or only has an empty strip of the target file, a response message indicating that the object to be deleted does not exist is returned to the processing module 303. If the storage server node that receives the data deletion request stores a valid strip or a parity strip of the target file, a response message indicating successful deletion is returned to the processing module 303 after the strip is deleted. If deletion cannot be performed or complete deletion cannot performed, a response message indicating unsuccessful deletion is fed back to the processing module 303. After receiving response messages of storage server nodes, the processing module 303 determines whether the sum of received response messages indicating that the object to be deleted does not exist and received response messages indicating successful deletion is greater than or equal to the quantity of the data strips, N, of the distributed file storage system. In other words, the quantity of strips of the target file that are stored in the distributed file storage system should not exceed the quantity of the parity strips, M, of the distributed file storage system, so as to ensure that the target file cannot be read from the distributed file storage system after the target file is deleted. If the sum of received response messages indicating that the strip does not exist and the received response messages indicating successful deletion is greater than or equal to the quantity of the data strips, N, of the distributed file storage system, a response message indicating successful deletion is returned to the user. Otherwise, a response message indicating unsuccessful deletion is returned to the user.

With the device provided in this embodiment of the present disclosure, when a file is to be written to a distributed file storage system, an N'+M redundancy protection mechanism is used according to a size of the file to be written, that is, when striping is performed on the target file, a different quantity of strips are generated according to the size of the target file, that is, different quantity of actual strips, N', are generated. This not only can ensure that an expected target file can be acquired correctly in any case, but also can effectively reduce a quantity of empty strips in the distributed file storage system, reduce a quantity of disk IO operations and network IO operations in the distributed file storage system, and improve the performance of the distributed file storage system.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present disclosure.

If the functions are implemented in a form of computer software, and sold or used as an independent product, all or a part (for example, the part contributing to the prior art) of the technical solutions of the present disclosure may be deemed, to some extent, to be implemented in a form of a computer software product. The computer software product is generally stored in a computer readable non-volatile storage medium and includes several instructions for instructing a computer device (which may be a personal computer, a server, or a network device, or the like) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data writing method, comprising:
   receiving a data processing request from a host, the data processing request carrying a data identifier and a target data;
   obtaining a redundancy information according to the data identifier, the redundancy information indicating a N+M redundancy protection for the target data, N being a default quantity of data strips, M being a default quantity of parity strips, N being a positive integer, and M being a positive integer;
   dividing the target data into DSC data strips, DSC being less than N, and DSC being a positive integer;
   combining at least M-DSC+1 empty data strips with the DSC data strips to obtain N' actual data strips when DSC is less than M, M being less than N', and N' being less than N;
   using the DSC data strips as the N' actual data strips when DSC greater than M;
   generating M parity strips from the N' actual data strips; and
   writing the N' actual data strips and the M parity strips to a distributed data storage system.

2. The method of claim 1, wherein M and N are separately stored in a corresponding directory information table.

3. The method of claim 1, further comprising adding consistency label information and information about a quantity of the DSC data strips to the N' actual data strips and the M parity strips.

4. A server for data processing, comprising:
   a memory comprising instructions; and
   a processor coupled to the memory, the processor being configured to execute the instructions to:

receive a data processing request from a host, the data processing request carrying a data identifier and a target data;

obtain a redundancy information according to the data identifier, the redundancy information indicating a N+M redundancy protection for the target data, N being a default quantity of data strips, M being a default quantity of parity strips, N being a positive integer, and M being a positive integer;

divide the target data into DSC data strips, DSC being less than N, and DSC being a positive integer;

combine at least M-DSC+1 empty data strips with the DSC data strips to obtain N' actual data strips when DSC is less than M, M being less than N', and N' being less than N;

use the DSC data strips as the N' actual data strips when DSC greater than M;

generate M parity strips from the N' actual data strips; and send the N' actual data strips and the M parity strips to a distributed data storage system.

5. The server of claim 4, wherein the server is an application server coupled to the distributed data storage system, and the distributed data storage system comprises a plurality of storage server nodes.

6. The server of claim 5, wherein the processor is further configured to add consistency label information to the N' actual data strips and the M parity strips, and the consistency label information is a timestamp.

7. The server of claim 4, wherein M and N are separately stored in a corresponding directory information table.

8. The method of claim 1, wherein the target data is a file, and the data identifier is an identifier of the file.

9. The method of claim 1, wherein at least one of the DSC data strips is partially filled with data from the target data.

10. The server of claim 4, wherein the target data is a file, and the data identifier is an identifier of the file.

11. The server of claim 4, wherein the server is an application server coupled to the distributed data storage system, and the distributed data storage system comprises a plurality of storage server nodes that implement a version of redundant array of independent disks (RAID).

12. The server of claim 5, wherein the processor is further configured to add consistency label information to the N' actual data strips and the M parity strips, and the consistency label information is a version number.

13. The server of claim 5, wherein at least one of the DSC data strips is partially filled with data from the target data.

* * * * *